United States Patent
Shimizu

(10) Patent No.: US 6,904,234 B2
(45) Date of Patent: Jun. 7, 2005

(54) CAMERA AND WIDE-ANGLE FIELD DISTANCE-MEASURING CAMERA

(75) Inventor: Saori Shimizu, Koganei (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/449,561

(22) Filed: May 30, 2003

(65) Prior Publication Data

US 2004/0047621 A1 Mar. 11, 2004

(30) Foreign Application Priority Data

Jun. 4, 2002 (JP) .......................................... 2002-163082
Jul. 1, 2002 (JP) .......................................... 2002-192447

(51) Int. Cl.$^7$ ................................................. G03B 7/08
(52) U.S. Cl. ........................ 396/100; 396/165; 396/234; 396/121
(58) Field of Search ................................. 396/100, 165, 396/121–123, 233, 234

(56) References Cited

U.S. PATENT DOCUMENTS 6,215,961 B1 * 4/2001 Mukai et al. ............... 396/100

FOREIGN PATENT DOCUMENTS

| JP | 05-264887 A | 10/1993 |
| JP | 07-199039 A | 8/1995 |
| JP | 2001-141984 A | 5/2001 |

* cited by examiner

Primary Examiner—W. B. Perkey
(74) Attorney, Agent, or Firm—Frishauf, Holtz, Goodman & Chick, P.C.

(57) ABSTRACT

A camera includes a sensor array which can detect a brightness signal of a subject and has a plurality of segments for focal point detection, a first photometry unit for calculating the brightness signal of the subject on the basis of an output of one segment or outputs of the segments of the sensor array, a second photometry unit which can detect a brightness signal of the subject in a detection range wider than that for the detection of the subject brightness signal by the sensor array, and a determination unit for determining on the basis of an output of the second photometry unit whether the use of the first photometry unit is forbidden. The camera can determine backlight without any inconvenience even on photographing condition close to the very limit of a photometrical range.

1 Claim, 15 Drawing Sheets

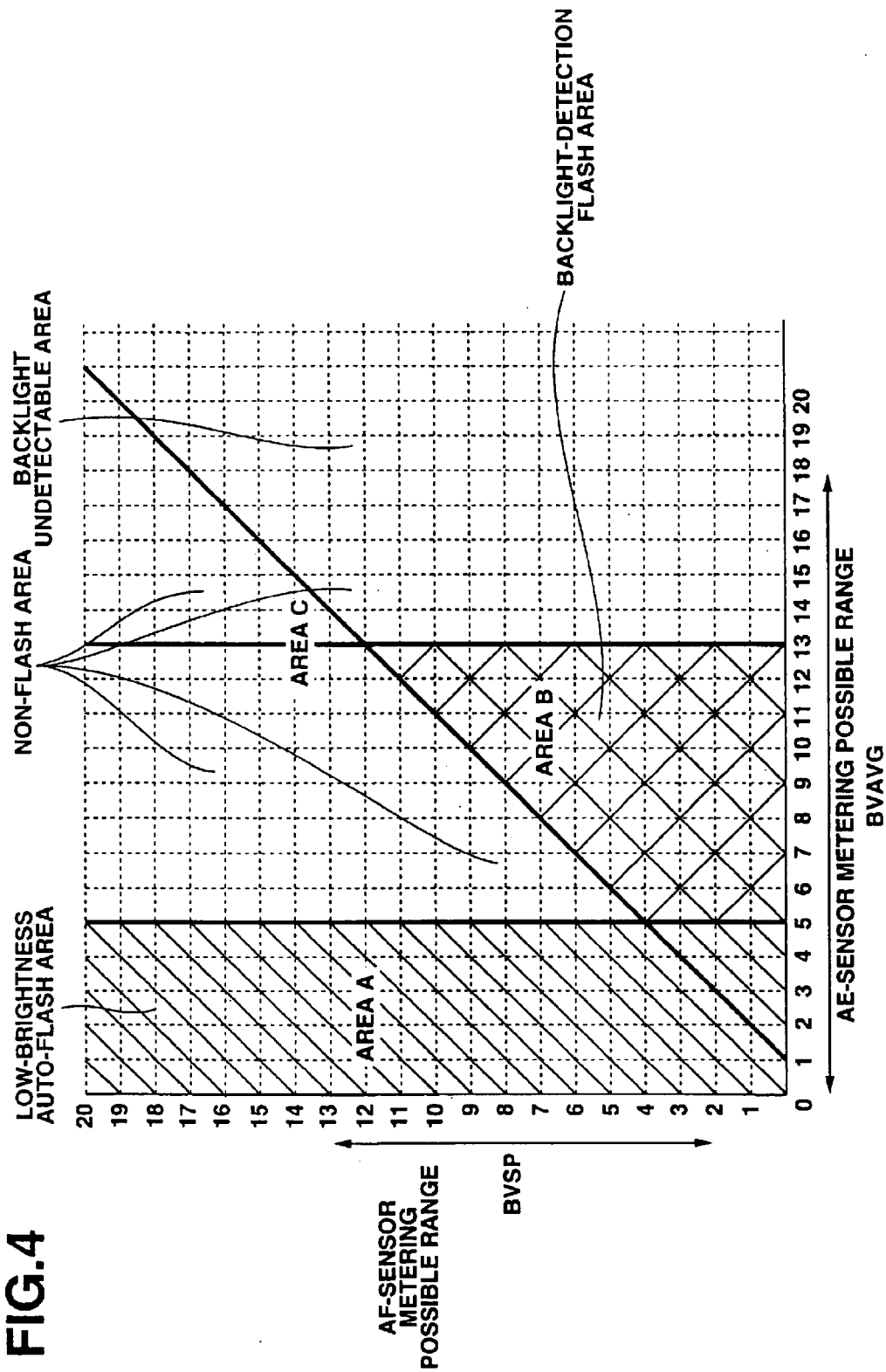

MONITOR SETTING DATA
1111111111111111B=FFFFH

MONITOR SETTING DATA
0000111111110000B=0FF0H

RELATIVE ART

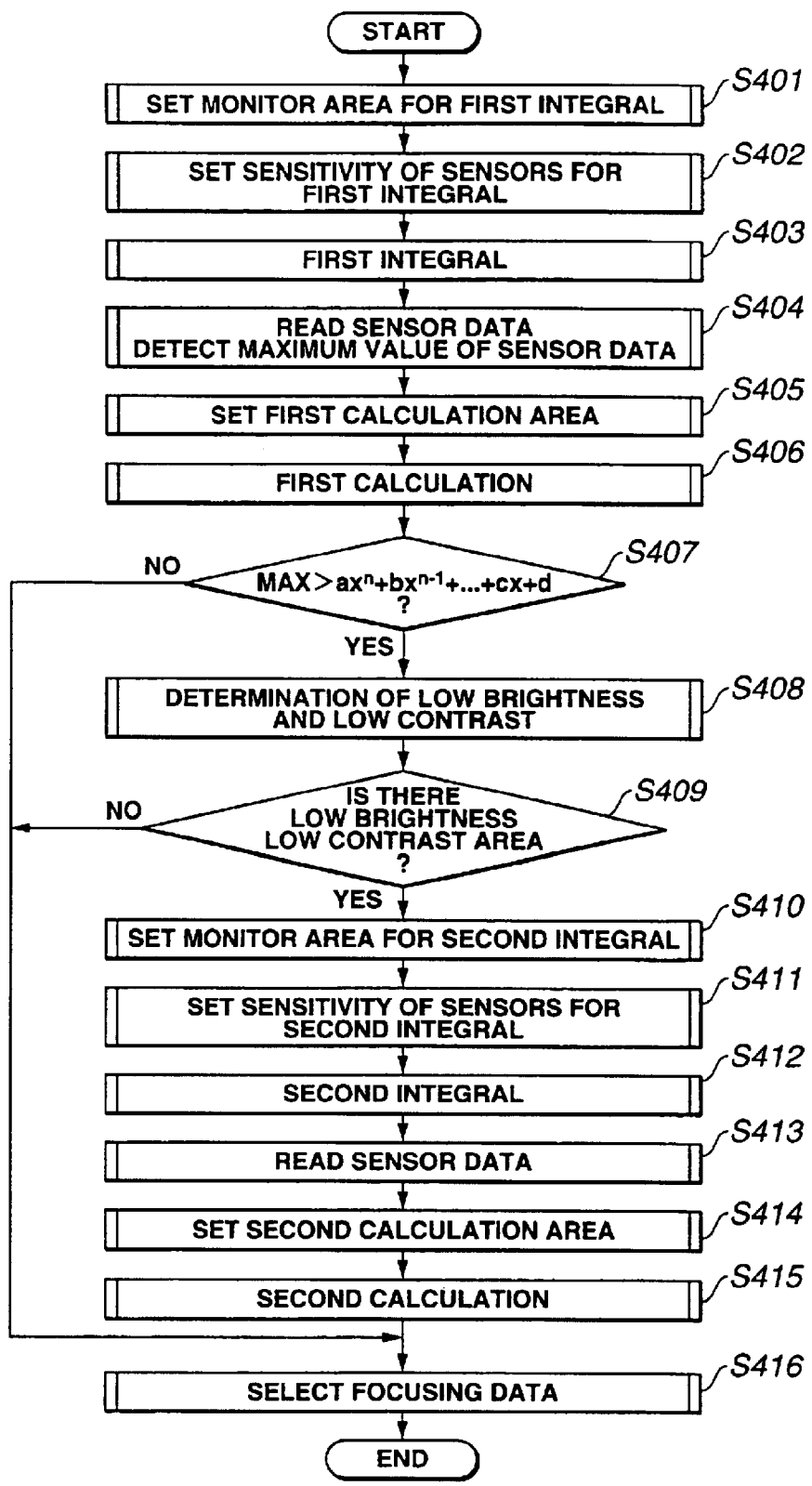

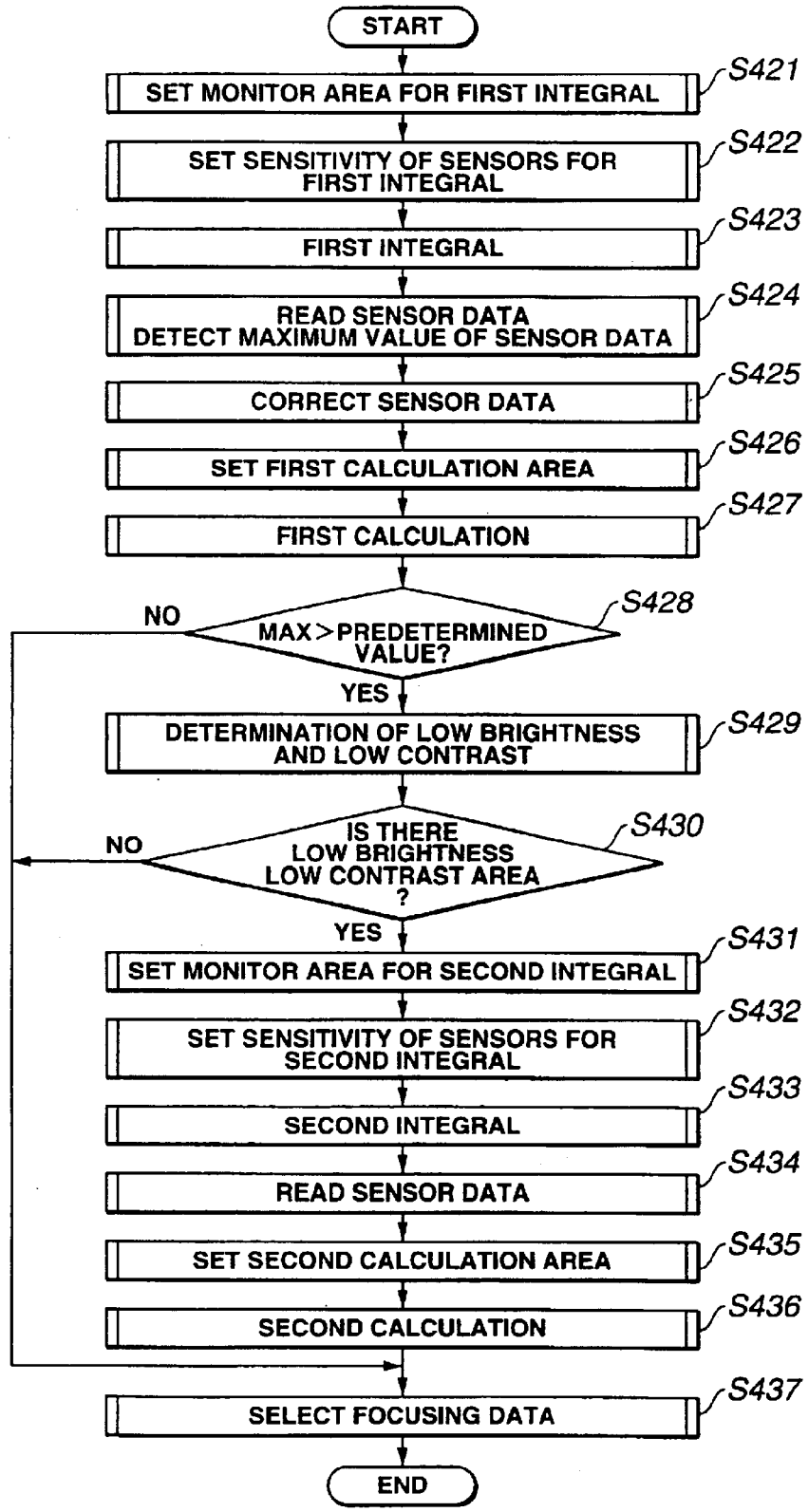

CAMERA AND WIDE-ANGLE FIELD DISTANCE-MEASURING CAMERA

This application claims the benefit of Japanese Applications No. 2002-163082 filed in Japan on Jun. 4, 2002 and No. 2002-192447 filed in Japan on Jul. 1, 2002, the entire contents of which are incorporated herein by reference.

BACKGROUND OF THE INVENTION

1. Field of the Invention

The present invention relates to cameras, and more particularly to a camera having a backlight determination function and a wide-angle field distance-measuring camera having a passive auto-distance-measuring device that is used in cameras and video cameras and the like.

2. Related Art Statement

As cameras having a backlight determination function, a camera which measures the brightness of a primary subject using a photometric sensor to detect backlight has been known.

As the cameras having a backlight determination function, an area AF camera is known. In the area AF camera, the brightness of a primary subject, selected by an AF sensor, is measured using the AF sensor and the obtained brightness is compared to the average brightness obtained by an AE sensor, thus determining backlight.

In this type of camera, different sensors from the AF sensor and the AE sensor are used in order to accomplish the original objective of the AF sensor and that of the AE sensor. A dynamic range required for photometry is fairly large. Accordingly, in many cases, the respective sensors are generally designed so as to have sensitivity fairly close to the maximum dynamic range necessary for photographing.

In the above-mentioned camera based on the conventional techniques, the two different sensors necessarily have different photometrically possible ranges.

Particularly, many AF sensors generally use a method for integrating a photoelectric current of the sensor and obtaining the brightness of a subject on the basis of the time that elapsed before the integrated value reaches a threshold level. Accordingly, if the brightness is high, the photoelectric current is large, the time that elapsed before the integrated value reaches the threshold level is short, and a photometrical range for the high brightness is small.

In this instance, under photographing conditions that are fairly close to the maximum possible photometrical range or exceeding this range, backlight cannot be detected with accuracy. Disadvantageously, incorrect backlight detection is caused.

For example, for a subject area where the brightness of a subject exceeds the limit value of brightness which the AF sensor can measure but the subject brightness lies within a possible photometrical range of the AE sensor, the AF sensor exceeds the limit value of photometry. Consequently, the AF sensor outputs data which is different from the actual brightness of the subject, resulting in incorrect backlight detection. Although there is no backlight in fact, the camera may determine backlight by mistake.

On the other hand, AF cameras with a passive auto-distance-measuring device have been well-known. When this type of camera photographs a backlight scene or a scene in a nightscape as a background, integral action for measuring distance is performed using a high-brightness area of the background or a light source as a reference. Accordingly, a proper image signal of a person serving as a primary subject cannot be obtained. Disadvantageously, the person is out of focus but the background is in focus.

In order to overcome the above disadvantages, according to a distance-measuring method disclosed in Japanese Unexamined Patent Application Publication No. 5-264887, backlight is detected using photometric data and data of a distance-measuring sensor and, when a backlight mode is detected, a monitor area to monitor subject-brightness information, which is used for integral action, is set at the center of a capturing area. Alternatively, integration is performed using an area having the lowest integral speed of a plurality of preset monitor areas as a reference. Thus, poor auto-distance-measuring for the primary subject in the backlight mode is improved.

According to a distance-measuring method disclosed in Japanese Unexamined Patent Application Publication No. 7-199039, a nightscape mode for nightscape photographing is provided. When the nightscape mode is set, whether auxiliary light is needed is determined. When it is determined that brightness is low, auxiliary light is emitted to improve poor auto-distance-measuring in the nightscape photographing.

For the distance-measuring method disclosed in Japanese Unexamined Patent Application Publication No. 5-264887, however, when the high-brightness area of the background includes spotted light reflected by an object with high reflectivity, or when a primary subject such as a person exists on a position other than the center of the capturing area, backlight cannot be detected or image signals of a primary subject is saturated, so that the subject image which is out of focus may be captured.

For the distance-measuring method disclosed in Japanese Unexamined Patent Application Publication No. 7-199039, when a light source is bright in a nightscape as a background, auxiliary light may not be emitted. If the auxiliary light is emitted, in some cases, the amount of light may be insufficient and the effect of the auxiliary light may not be derived sufficiently.

In consideration of the above disadvantages, Japanese Unexamined Patent Application Publication No. 2001-141987 discloses that a first integral is performed on condition that a monitor area is set wider than conventional monitor areas, when the contrast of a low brightness area in output data of line sensors obtained by a first integral is low, the low brightness area is set to a monitor area, and a second integral is performed to this area. When a backlight scene is photographed or a scene in a nightscape as a background is photographed, image signals of a person serving as a primary subject can be obtained.

When a taking lens with a wide-angle focal length is used, a distance-measuring area is formed with a wide angle. Therefore, in some cases, the line sensors are used from end to end. Accordingly, due to the influence of a deterioration in the performance of reception lenses of an AF sensor or a degradation in the sensitivity of the line sensors, the end portions of each line sensor generate output data indicating lower brightness than that indicated by data generated from the central portion of each line sensor.

FIG. 24 shows output data of line sensors when a uniform brightness area is monitored. FIG. 24 shows the fact that the respective end portions of the line sensors generate data indicating brightness darker than that indicated by data of the central portions thereof. In this case, when distance-measuring control is performed according to a method disclosed in Japanese Unexamined Patent Application Publication No. 2001-141987, it is determined by mistake that output data of the end portions of the line sensors indicates low brightness. Disadvantageously, photographing is performed with poor distance-measuring.

SUMMARY OF THE INVENTION

The present invention is made in consideration of the above circumstances. It is an object of the present invention to provide a camera having a system for detecting backlight using an AF sensor and an AE sensor. In the camera, when a photometrical value obtained by at least one sensor is equal to or larger than predetermined brightness, backlight detection is not performed. Accordingly, even under photographing condition close to the maximum possible photometric range of one sensor, backlight determination can be performed without any inconvenience.

Another object of the present invention is to provide a wide-angle field distance-measuring camera with a distance-measuring device which can measure the distance to a primary subject with reliability independently of the condition of a high brightness area of a background when a backlight scene or a scene in a nightscape as a background is photographed using a wide-angle lens.

According to the present invention, there is provided a camera including: a sensor array which can detect a brightness signal of a subject and has a plurality of segments for focal point detection; a first photometry means for calculating the brightness signal of the subject on the basis of an output of one segment or outputs of the segments of the sensor array; a second photometry means which can detect a brightness signal of the subject in a detection range wider than that for the detection of the subject brightness signal by the sensor array; and a determination means for determining on the basis of an output of the second photometry means whether the use of the first photometry means is forbidden. AF-sensor spot is forbidden in accordance with brightness measured by photometric sensors.

According to the present invention, there is provided a camera including: an exposure means which is used in photographing a subject; a sensor array which can detect a brightness signal of the subject and has a plurality of segments for focal point detection; a first photometry means for calculating the brightness signal of the subject on the basis of an output of one segment or outputs of the segments of the sensor array; a second photometry means which can detect a brightness signal of the subject in a detection range wider than that for the detection of the subject brightness signal by the sensor array; and a determination means for determining, in accordance with a result of determination of whether the difference between the brightness signals obtained by the first and second photometry means is larger than a predetermined value, whether exposure used in photographing the subject is changed, wherein the determination means changes the determination regarding the exposure in accordance with an output of the first photometry means. In other words, a threshold level used in backlight determination is changed in accordance with brightness measured by photometric sensors.

According to the present invention, there is provided a wide-angle field distance-measuring camera having a distance-measuring device, the distance-measuring device including: a pair of reception lenses for forming an image of a subject on a pair of line sensors; the pair of line sensors for converting the subject image formed by the reception lenses into electric signals in accordance with the intensity of light; an integral control means for performing integral control of the pair of line sensors; a calculation means for calculating data corresponding to a camera-to-subject distance on the basis of subject image data generated from the pair of line sensors. The distance-measuring device further includes: a monitor means for monitoring subject-brightness information used in the integral control; a monitor control means for setting a monitor area and outputting monitor data; and a low-brightness-area determination means for determining a low brightness area included in output data of the line sensors in consideration of the influence of a deterioration in the performance of the reception lenses or a degradation in the sensitivity of the sensors, with the output data being obtained by integral. The low-brightness-area determination means changes a threshold value used in determination of the low brightness area in the output data in the central portion of each line sensor and the peripheral portions thereof. The low-brightness-Area determination means approximates a threshold value used in determination of the low brightness area in the output data of the line sensors with a high-order curve. Further, the low-brightness-area determination means corrects the output data of the line sensors by the amount as much as the influence of the deterioration in the performance of the reception lenses or the degradation in the sensitivity of the sensors, and then determines a low brightness area.

Other features and advantages of the present invention will become apparent from the following description.

BRIEF DESCRIPTION OF THE DRAWINGS

FIG. 4 is a graph showing the relationship between brightness BVSP measured by distance-measuring sensors, brightness BVAVG measured by photometric sensors, and stroboscopic light emission in executing a photographing sequence of FIG. 5, which will be described later;

FIG. 22 is a flowchart of a distance-measuring sequence using a threshold line as a high-order curve in the distance-measuring device of the wide-angle field distance-measuring camera according to the third embodiment of the present invention;

FIG. 23 is a flowchart of a distance-measuring sequence of correcting sensor output data to perform correct distance-measuring in the distance-measuring device of the wide-angle field distance-measuring camera according to the fourth embodiment of the present invention.

DETAILED DESCRIPTION OF THE PREFERRED EMBODIMENTS

Embodiments of the present invention will now be described hereinbelow with reference to the drawings.

Figure 1:
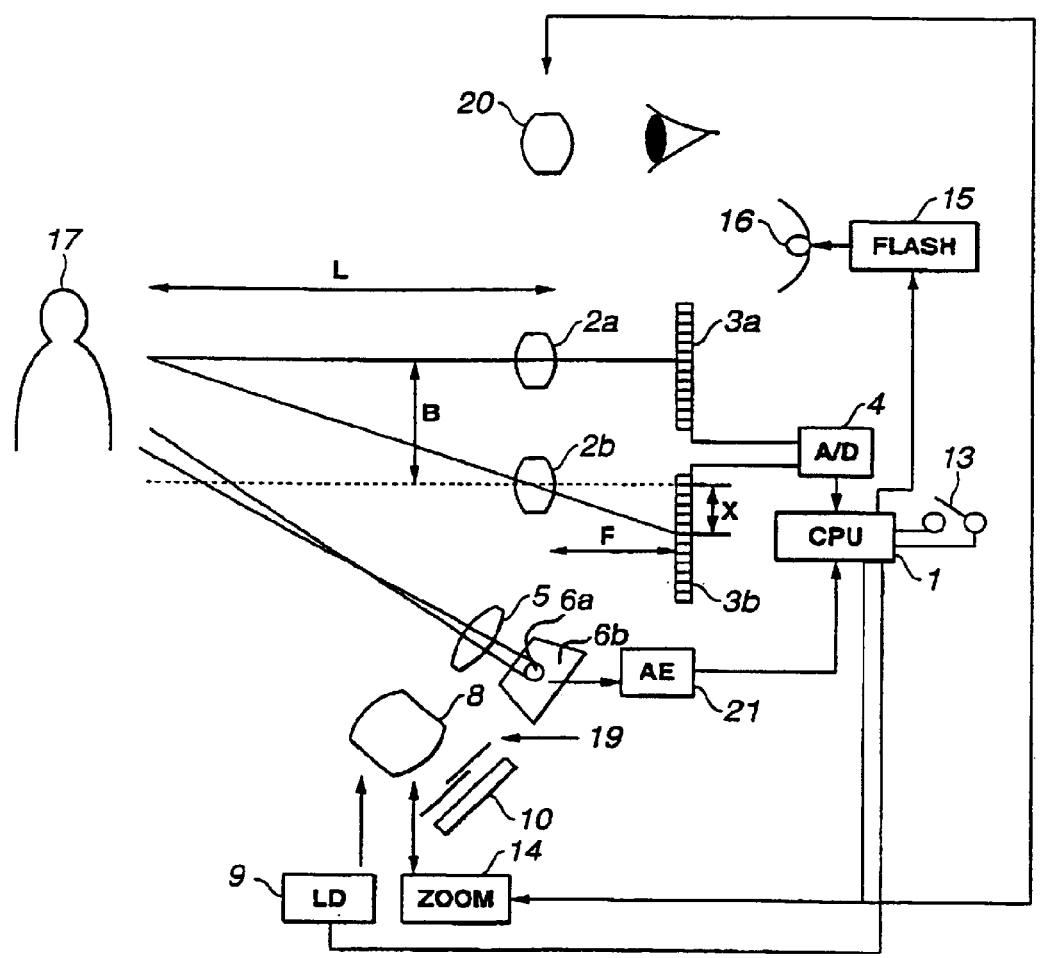
FIG. 1 is a block diagram showing the structure of an essential part of a camera according to a first embodiment of the present invention.

FIG. 1 is a block diagram showing the structure of an essential part of a camera according to a first embodiment of the present invention.

FIG. 1 shows the block diagram of a lens-shutter type silver-halide film camera for photographing an subject image captured by a taking lens 8 on a film 10 by opening or closing a shutter 19.

According to the present embodiment, the camera has a CPU 1 for controlling the whole camera. The CPU 1 serves as control means comprising, for example, a one-chip microcomputer for controlling all of sequences of the camera. The CPU further includes: first photometry means for calculating a brightness signal of a subject on the basis of outputs of sensor arrays 3a and 3b, which will be described later; and determination means for determining on the basis of an output of second photometry means, which will be described later, whether the use of an output of the first photometry means is forbidden.

The CPU 1 performs a process of executing a predetermined photographing sequence in accordance with control of switch input means 13 through a photographer.

Distance-measuring means for measuring the distance to a subject 17 comprises: two reception lenses 2a and 2b, the pair of sensor arrays (distance-measuring sensors) 3a and 3b, and A/D conversion means 4. Subject image signals, obtained through the two reception lenses 2a and 2b disposed at a distance of a base length B from each other, are photoelectrically converted by the pair of sensor arrays 3a and 3b, and the resultant signals are analog-to-digital converted into digital image signals by the A/D conversion means 4.

The CPU 1 compares this pair of digital image signals to obtain a relative parallax X between the image input signals.

In other words, the relative parallax X varies such that $X=B\times F/L$, wherein a camera-to-subject distance is L, a focal length of the reception lenses 2a and 2b is F, and the foregoing base length is B. Accordingly, when the parallax X is detected, the distance-measuring distance L can be calculated by the CPU 1.

Figure 2:
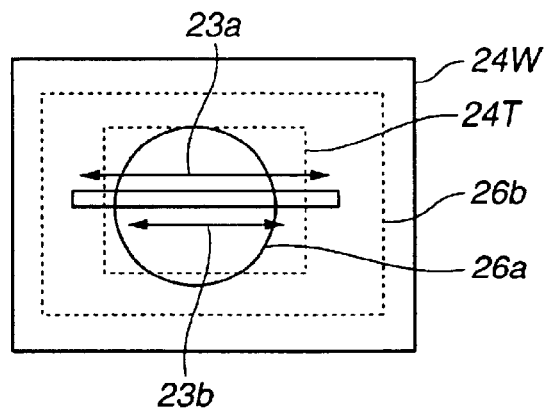
FIG. 2 is a diagram showing the relationship between a capturing field of view and a distance-measuring field of view in the camera of FIG. 1.

The sensor arrays 3a and 3b are, for example, non-TTL-AF type. The sensor arrays 3a and 3b are laterally arranged in the camera. When a subject scene is photographed as shown in FIG. 2, the sensor arrays 3a and 3b monitor an area 23a.

Figure 3A:
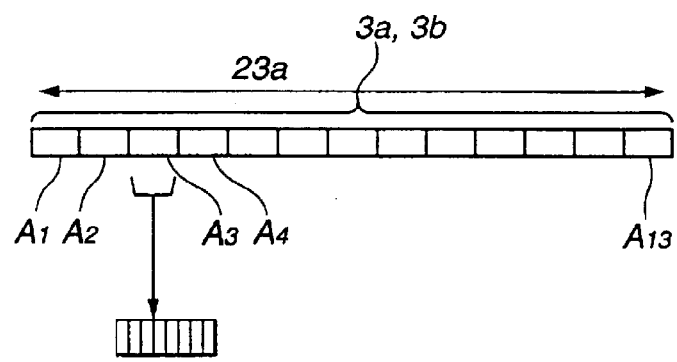
FIG. 3A is a diagram showing the structure of each sensor array (distance-measuring sensor) in the camera of FIG. 1 and a distance-measuring field-of-view area (monitor area) in a wide-angle mode.

As shown in FIG. 3A, the whole monitor area 23a is divided into 13 blocks. The above-mentioned parallax X is detected using image signals corresponding to the respective blocks, so that distances of 13 points in a capturing area can be measured.

For 13 distance-measuring signals obtained as mentioned above, the distance-measuring signal indicating, for example, the shortest distance, denotes a camera-to-primary-subject distance.

A photographing optical system including the taking lens 8 serving as a zoom lens, the reception lenses 2a and 2b included in a distance-measuring optical system, and an AE lens 5 included in a photometric optical system are arranged separately from each other.

When the photographer controls an operating member (not shown), the CPU 1 controls a zoom driving circuit 14 to drive the taking lens 8 in order to shift the focal length of the taking lens 8 from a wide-angle mode to a telephoto mode, so that a capturing angle of field and a capturing field of view can be changed.

This camera has a finder optical system 20 through which the photographer confirms a capturing area.

The finder optical system 20 is constructed so as to operate in accordance with the focal length of the taking lens 8.

In other words, when the CPU 1 controls the zoom driving circuit 14 to shift the focal length of the taking lens 8 from the wide-angle mode to the telephoto mode, the finder optical system 20 is also driven. Thus, the focal length is shifted from the wide-angle mode to the telephoto mode.

The camera is designed such that a finder field of view is the same as the field of view of the taking lens 8 independently of the focal length. When the photographer looks through the finder optical system 20, he or she can recognize a capturing range (field of view).

As mentioned above, the photographing optical system and the distance-measuring optical system are arranged separately from each other. For example, when the taking lens 8 is arranged in the wide-angle mode, the capturing field of view is shown by reference numeral 24W in FIG. 2 and the field-of-view area of the sensor arrays 3a and 3b is shown by reference numeral 23a.

When the taking lens 8 is arranged in the telephoto mode, the capturing field is shown by reference numeral 24T in FIG. 2. On the other hand, the distance-measuring optical system includes the fixed lenses which do not move in accordance with the focal length of the taking lens 8. Therefore, the field-of-view area of the sensor arrays 3a and 3b is not changed. The relationship between the capturing field and the distance-measuring field-of-view area is shown by the relationship between 24T and 23a.

When the capturing field is shown by 24W in FIG. 2, multi-point AF (multi-AF) with 13 points is performed in the field shown by the area 23a including the 13 blocks of each of the sensor arrays (distance-measuring sensors) 3a and 3b. As shown in FIG. 3A, each of the sensor arrays 3a and 3b is composed of 13 sensor segments A1 to A13 each having a plurality of pixels.

Figure 3B:
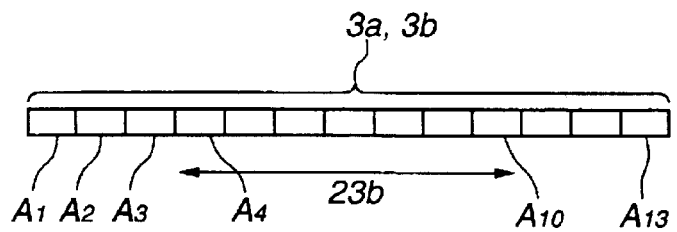
FIG. 3B is a diagram showing a distance-measuring field-of-view area in a telephoto mode of each sensor array (distance-measuring sensor) in the camera of FIG. 1.
Figure 7:
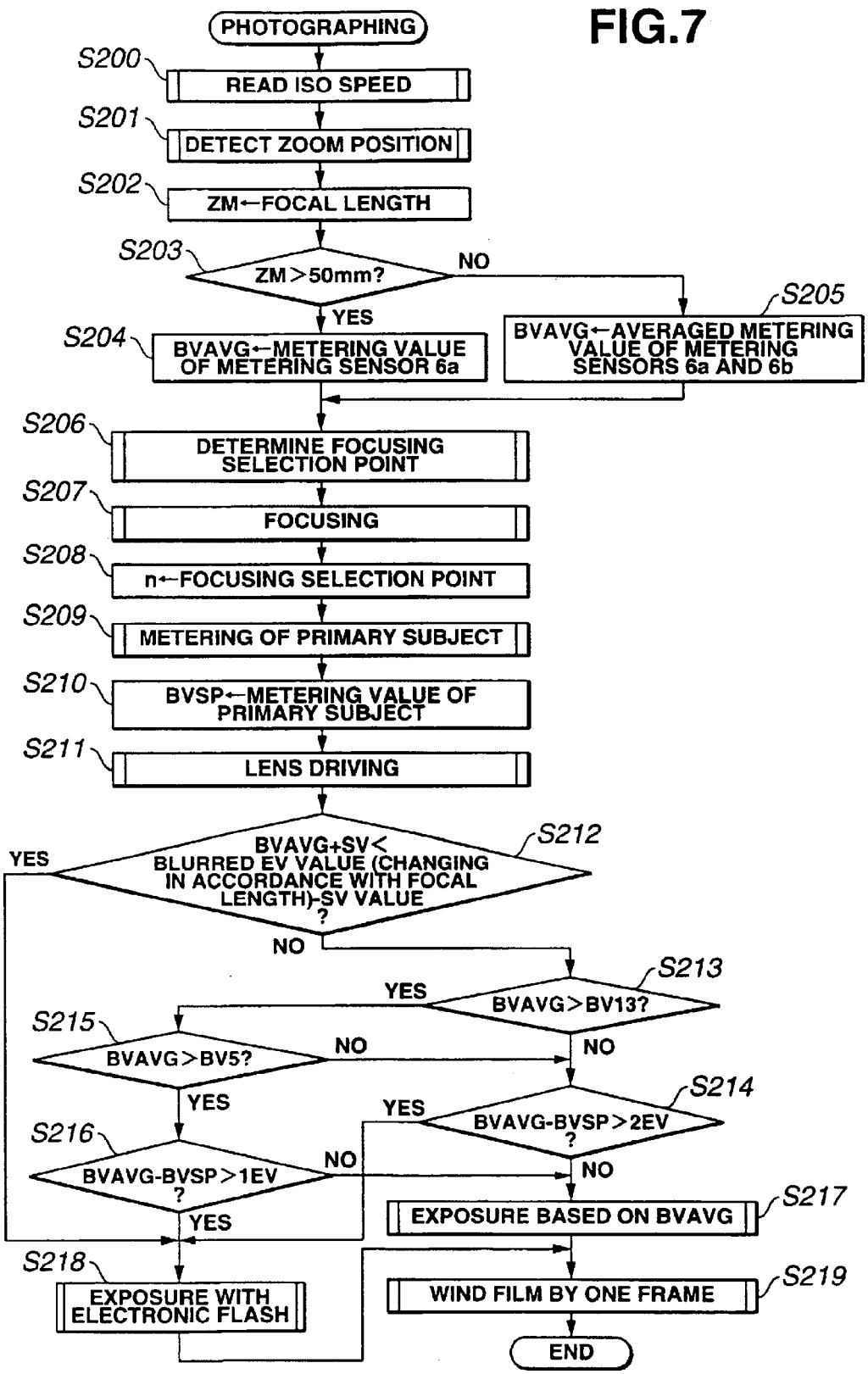
FIG. 7 is a flowchart of a modification example of the photographing sequence in the application of a zoom lens camera capable of changing a focal length in a range of 35 mm to 80 mm as the camera of FIG. 1 according to the first embodiment.

When the capturing field is shown by 24T in FIG. 2, as shown in FIG. 3B, 7-point AF (multi-AF) is performed in a distance-measuring area 23b, namely, using seven segments of the 13 segments of each of the sensor arrays 3a and 3b.

Referring to FIG. 1, split type photometric sensors 6a and 6b for receiving light which passes through the AE lens 5 are included in second photometry means.

Outputs of the photometric sensors 6a and 6b are converted by an AE circuit 21 comprising a logarithmic compression circuit, the AE circuit 21 being included in the second photometry means. Thus, brightness in the capturing area is measured. On the basis of the brightness, the CPU 1 performs exposure control.

The photometric optical system is separated from the optical system including the taking lens 8 and does not operate in interlocking with the focal length of the taking lens 8.

Accordingly, the field of view obtained when the taking lens 8 is arranged in the wide-angle mode is set to 24W, that obtained when the taking lens 8 is arranged in the telephoto mode is set to 24T. FIG. 2 shows the correspondence between the fields 24W and 26b of the photometric sensor 6b and between the fields 24T and 26a of the photometric sensor 6a.

Therefore, when the taking lens 8 is disposed in the telephoto mode, the outputs of the sensor 6a are used. When the taking lens 8 is arranged in the wide-angle mode, the sum of the outputs of the respective sensors 6a and 6b is used. Thus, photometry in substantially the same range as the capturing field can be performed.

Figure 3C:
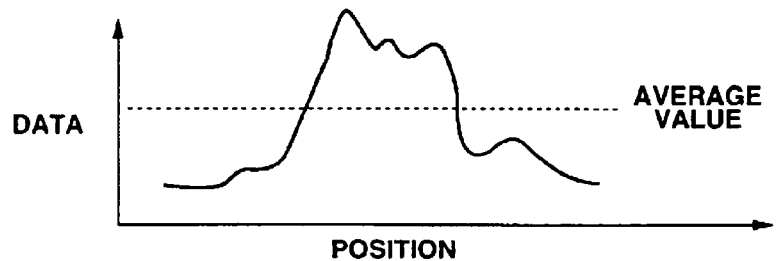
FIG. 3C is a diagram showing image data obtained in correspondence to distance-measuring points captured by the sensor arrays (distance-measuring sensors) in the camera of FIG. 1.

As shown in FIGS. 3A and 3B, the sensor arrays 3a and 3b each have the 13 sensor segments A1 to A13, obtained by dividing each sensor array into 13 segments, and each segment has strip pixels corresponding to a distance-measuring point. Since each pixel outputs data corresponding to shades of an image, image data is obtained as shown in FIG. 3C.

When image outputs obtained as mentioned above are averaged, the average brightness of the respective distance-measuring points can be obtained.

Figure 5:
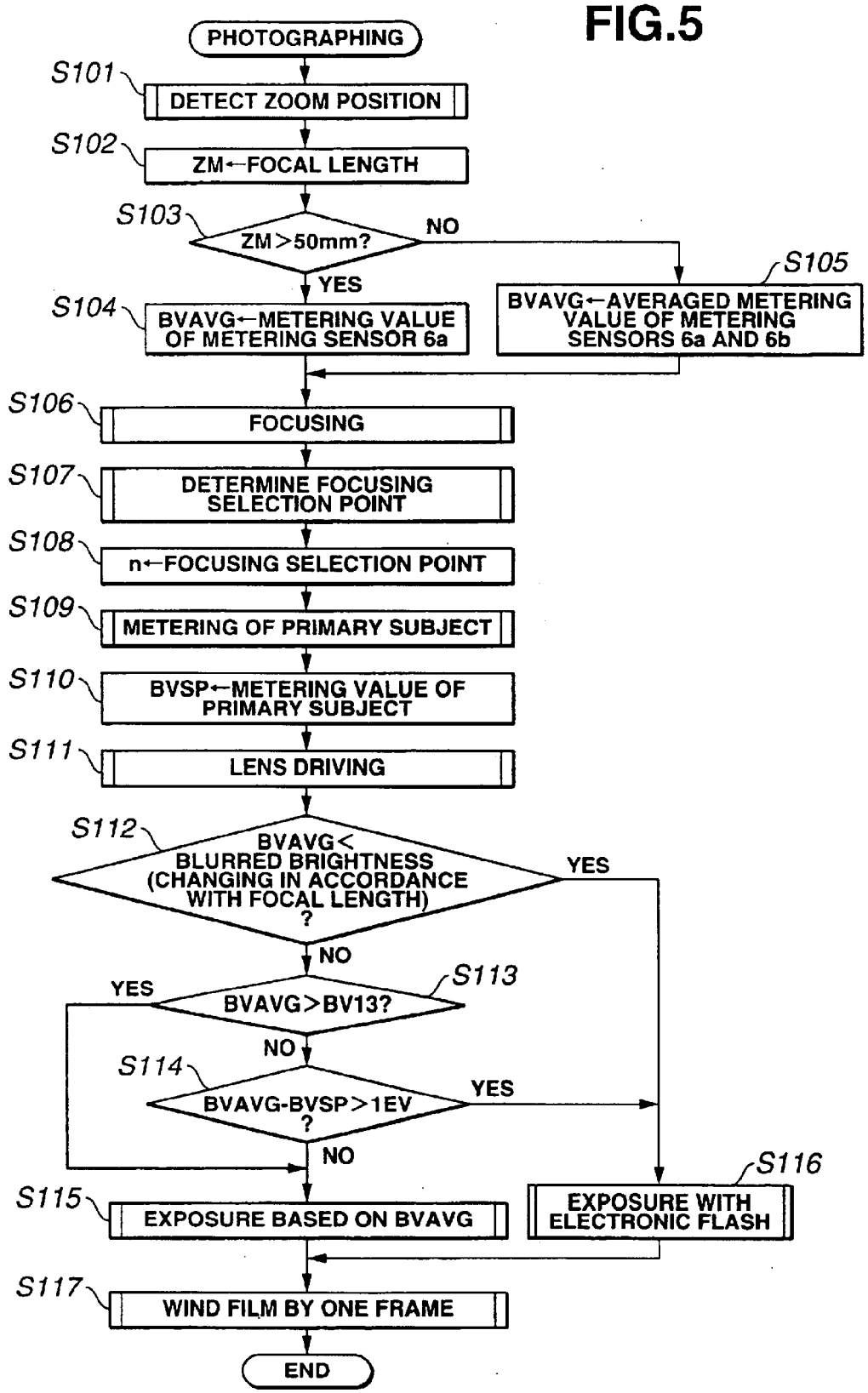
FIG. 5 is a flowchart of the photographing sequence in the application of a zoom lens camera capable of changing a focal length in a range of 35 mm to 80 mm as the camera of FIG. 1.

In the above-mentioned structure, the position of a primary subject can be detected with multi-AF. In addition, brightness at the position thereof can be obtained. Consequently, on the basis of a process flow as shown in FIG. 5, which will be described in detail later, photographing putting weight on the primary subject can be realized by exposure control.

The photometry process using the distance-measuring sensors (sensor arrays) 3a and 3b will be described in detail later.

On the basis of a distance-measured result by the multi-AF, the CPU 1 controls the taking lens 8 via a taking-lens control circuit (LD) 9 to focus on a subject, and opens or closes the shutter 19 on the basis of the photometry result obtained by the distance-measuring sensors 3a and 3b and the photometry result obtained by the photometric sensors 6a and 6b. Thus, photographing due to exposure control putting weight on the primary subject can be realized.

In the exposure control, the CPU 1 controls a flash circuit 15 to emit stroboscopic light 16 as necessary.

A concrete example of a zoom lens camera capable of changing a focal length in a range of 35 mm to 80 mm and having the above-mentioned structure will now be described with reference to FIGS. 4 and 5.

FIG. 5 is a flowchart explaining a concrete photographing sequence.

FIG. 4 is a graph explaining the relationship between brightness BVSP measured by the sensor arrays (distance-measuring sensors), brightness BVAVG measured by the photometric sensors, and the stroboscopic light emission in execution of the photographing sequence of FIG. 5.

When a photographer controls the operating member 13, the photographing sequence of FIG. 5 is started under the control of the CPU 1.

In step S101, a zoom position is detected, thus detecting to which focal length the taking lens 8 is currently set.

In step S102, the focal length detected in step S101 is stored in a variable ZM.

In step S103, whether the focal length of the taking lens 8 is longer than 50 mm so as to be in the telephoto mode is determined on the basis of the variable ZM. If the focal length thereof is in the telephoto mode, the sequence proceeds to step S104. If the focal length is in the wide-angle mode, i.e., 50 mm or less than 50 mm, the sequence proceeds to step S105.

In step S104, since the focal length of the taking lens 8 is in the telephoto mode, only the outputs of the foregoing photometric sensor 6a is used in average photometry. The average brightness of the whole capturing area obtained from the outputs of the photometric sensor 6a is stored in a variable BVAVG.

In step S105, since the focal length of the taking lens 8 is in the wide-angle mode, the average value of the outputs of the foregoing photometric sensors 6a and 6b is used in the average photometry. The average brightness of the whole capturing area obtained from the outputs of the photometric sensors 6a and 6b is stored in a variable BVAVG.

In steps S106 and S107, when the focal length is in the wide-angle mode, distance-measuring points corresponding to the 13 sensor segments are used. When the focal length is in the telephoto mode, seven distance-measuring points are used. A distance-measuring point which is around a primary subject is selected from those distance-measuring points (the detailed description is omitted because it is included in the explanation regarding FIGS. 1 and 3). The distance between the camera and the primary subject is calculated using the sensor arrays (distance-measuring sensors) which are around a point of the primary subject.

In step S108, the distance-measuring point of the primary subject is stored in a variable n (in this case, since there are 13 distance-measuring points, n denotes any of 1 to 13).

In step S109, the brightness of an area around the primary subject is measured using the sensor segments of the distance-measuring sensors 3a and 3b, which are around the primary subject.

In other words, since the variable n denotes n-th sensor segment in each distance-measuring sensor, the n-th segment corresponding to the distance-measuring point closest to the primary subject, the brightness of the n-th point sensor segment of each of the AF sensors is measured.

In step S110, the spot brightness of the primary subject, obtained in the primary subject photometry in step S109, is stored in a variable BVSP.

In step S111, the taking lens 8 is driven such that the subject is focused on the camera-to-subject distance obtained in step S106.

In step S112, on the basis of the average brightness of the whole capturing area obtained in step S104 or S105, whether the capturing area is dark and emission of the stroboscopic light 16 is needed is determined.

Specifically, BVAVG is compared to hand movement brightness which changes in accordance with the focal length. When BVAVG is lower than this brightness, the sequence proceeds to step S116. If NO, the sequence proceeds to step S113.

In step S113, whether the average brightness of the whole capturing area obtained in step S104 or S105 is equal to or higher than predetermined brightness is determined.

Specifically, BVAVG is compared to predetermined brightness BV (BV13). When BVAVG is lower than the predetermined brightness, the sequence proceeds to step S114. If NO, the sequence proceeds to step S115.

In this instance, according to the present embodiment, the photometry possible range of the distance-measuring sensors 3a and 3b includes BV2 to BV13 (corresponding to EV7 to EV18 obtained by converting BV2 to BV13 into EV values in the case of ISO 100).

When high brightness exceeding BV13 is incident, the distance-measuring sensors 3a and 3b output indeterminate values.

In the case of the high brightness, when the values of the spot distance-measuring sensors 3a and 3b are used in photometry for backlight detection, in the same way as step S113, whether the outputs of the distance-measuring sensors 3a and 3b are used in photometry is determined in accordance with the value BVAVG based on the outputs of the photometric sensor 6a or the sum of the outputs of the photometric sensors 6a and 6b, thus controlling such that the photometrical value exceeding the photometrically possible range of the distance-measuring sensors 3a and 3b is not used (a control process by the determination means built in the CPU 1).

In step S114, whether backlight is detected is determined on the basis of the brightness of the primary subject obtained in step S110 and the average brightness of the whole capturing area obtained in steps S104 or S105.

Specifically, BVAVG–BVSP is performed. When the brightness difference is larger than one scale, it is determined that backlight is detected. The sequence proceeds to step S116. If NO, the sequence proceeds to step S115.

In step S115, the shutter is controlled on the basis of an aperture scale according to the brightness BVAVG to expose the film 10.

In step S116, the shutter is controlled on the basis of the aperture scale according to the brightness BVAVG or the hand movement brightness to expose the film 10. Further, in order to perform the exposure appropriate to a backlighted subject, or in order to correct a dark capturing area, the stroboscopic light 16 is emitted by the flash circuit 15.

In step S117, since the exposure of the film 10 is completed, the film 10 is wound by one frame. The sequence is terminated.

FIG. 4 shows the relationship among the brightness BVSP measured by the distance-measuring sensors 3a and 3b, the brightness BVAVG measured by the photometric sensors 6a and 6b, and the stroboscopic light emission in accordance with the sequence shown in FIG. 5. In FIG. 4, the abscissa axis denotes the brightness BVAVG measured by the photometric sensors 6a and 6b. The ordinate axis denotes the brightness BVSP of the primary subject measured by the distance-measuring sensors 3a and 3b.

Referring to FIG. 4, an area A denotes a low-brightness auto-flash area in which stroboscopic light is emitted on the basis of the determination of low brightness in step S112 mentioned above.

An area B denotes a backlight auto-flash area in which stroboscopic light is emitted on the basis of the determination of backlight in step S114 mentioned above.

An area C denotes a non-flash area in which stroboscopic light is not emitted on the basis of the determination of whether backlight detection is performed in step S113 mentioned above.

In the above concrete example, whether brightness lies within a range where the distance-measuring sensors 3a and 3b can be used to measure brightness is determined on the basis of the photometrical value obtained by the photometric sensors 6a and 6b. Accordingly, the distance-measuring sensors 3a and 3b are not used when brightness exceeds the distance-measuring-sensor applicable range. Thus, incorrect backlight determination is not performed.

A modification example of the photographing sequence according to the above-mentioned embodiment will now be described hereinbelow with reference to FIGS. 6 and 7. In this modification, a zoom lens camera which can change a focal length in a range of 35 mm to 80 mm is similarly used.

FIG. 7 is a flowchart explaining the photographing sequence as the modification. FIG. 6 shows the relationship among the brightness BVSP measured by the distance-measuring sensors, the brightness BVAVG measured by the photometric sensors, and the stroboscopic light emission in the photographing sequence as the modification of FIG. 7.

When a photographer first controls the operating member 13, the photographing sequence of FIG. 7 is started under the control of the CPU 1.

In step S200, the ISO sensitivity of the film 10 is detected. The detected sensitivity is converted into an SV value. The SV value is stored in a variable SV.

In step S201, a zoom position is detected, thus detecting to which focal length the taking lens 8 is currently set.

In step S202, the focal length detected in step S201 is stored in a variable ZM.

In step S203, whether the focal length of the taking lens 8 is longer than 50 mm so as to be in the telephoto mode is determined on the basis of the variable ZM. If the focal length is in the telephoto mode, the sequence proceeds to step S204. If the focal length is in the wide-angle mode, i.e., 50 mm or less than 50 mm, the sequence proceeds to step S205.

In step S204, since the focal length of the taking lens is in the telephoto mode, only the output of the foregoing photometric sensor 6a is used as photometric sensor in average photometry.

The average brightness of the whole capturing area obtained from the output of the photometric sensor 6a is stored in a variable BVAVG.

In step S205, since the focal length of the taking lens is in the wide-angle mode, the average value of the respective outputs of the foregoing photometric sensors 6a and 6b are used as photometric sensor in the average photometry.

The average brightness of the whole capturing area obtained from the outputs of the photometric sensors 6a and 6b is stored in a variable BVAVG.

In step S206, a distance-measuring point which is near a primary subject is selected from 13 distance-measuring points (the detailed description has been made in the explanation regarding FIGS. 1 and 3).

In step S207, the camera-to-subject distance is calculated using the sensor segments in the vicinity of the point around the primary subject.

In step S208, the distance-measuring point closest to the primary subject is stored in a variable n (in this case, since there are 13 distance-measuring points in the wide-angle mode and there are seven distance-measuring points in the telephoto mode, n denotes any value of 1 to 13).

In step S209, the brightness of an area around the primary subject is measured using outputs of the sensor segments of the distance-measuring sensors, the sensor segments corresponding to the distance-measuring point n closest to the primary subject.

In step S210, the spot brightness of the primary subject, obtained using the sensor segments corresponding to the distance-measuring point n in the primary subject photometry, is stored in a variable BVSP.

In step S211, the taking lens 8 is driven via the taking-lens driving circuit (LD) 9 so that the subject is focused on the camera-to-subject distance obtained in step S207.

In step S212, on the basis of the average brightness of the whole capturing area obtained in step S204 or S205, whether the capturing area is dark and the emission of the stroboscopic light 16 is needed is determined.

Specifically, a hand movement EV value based on the focal length is compared to the sum of BVAVG and SV. If the sum of BVAVG and SV is smaller than the EV value, the sequence skips to step S218. If NO, the sequence proceeds to step S213.

In step S213, whether the average brightness of the whole capturing area obtained in step S204 or S205 is equal to or larger than predetermined brightness is determined.

Specifically, BVAVG is compared to the predetermined brightness BV13. If BVAVG is larger than BV13, the sequence proceeds to step S214. If NO, the sequence proceeds to step S215.

In step S214, whether backlight is detected is determined on the basis of the brightness of the primary subject obtained in step S210 and the average brightness of the whole capturing area obtained in S204 or S205.

Specifically, BVAVG−BVSP is calculated. When the brightness difference is larger than two scales, it is determined that backlight is detected. The sequence proceeds to step S218. If NO, the sequence proceeds to step S217.

In step S215, whether the average brightness of the whole capturing area obtained in step S204 or S205 is equal to or larger than the predetermined brightness is determined.

Specifically, BVAVG is compared to predetermined brightness BV5. If BVAVG is larger than BV5, the sequence proceeds to step S216. If NO, the sequence proceeds to step S214.

In step S216, whether backlight is detected is determined on the basis of the brightness of the primary subject obtained in step S210 and the average brightness of the whole capturing area obtained in step S204 or S205.

Specifically, BVAVG−BVSP is calculated. If the brightness difference is larger than one scale, it is determined that backlight is detected. The sequence proceeds to step S218. If NO, the sequence proceeds to step S217.

In this instance, according to the present embodiment, a range where the distance-measuring sensors 3a and 3b can perform photometry is a range of BV0 to BV15 (corresponding to EV5 to EV21 obtained by converting BV0 to BV15 into EV values in the case of ISO 100).

However, the distance-measuring sensors 3a and 3b have poor linearity in the high brightness side and the low brightness side. In photometry of high brightness exceeding BV13 and low brightness of BV5 or lower, errors increase.

Accordingly, in the photographing sequence according to the present modification, when the values of the distance-measuring sensors 3a and 3b are used in photometry for backlight detection in the case of high brightness or low brightness, a threshold value used in backlight determination is changed as performed in steps S213, S214, S215, and S216. The threshold value used in the backlight determination is changed from 1EV to 2EV in a range where a photometry error is small. Thus, incorrect backlight determination is not performed on the basis of the photometry errors of the outputs of the distance-measuring sensors 3a and 3b (a control process by the determination means built in the CPU 1 according to the present modification).

In step S217, the shutter 19 is controlled with an aperture scale based on the brightness BVAVG to expose the film 10.

In step S218, the shutter 19 is controlled with an aperture scale based on the brightness BVAVG, or the shutter 19 is controlled with an aperture scale based on a hand movement EV value, thus exposing the film 10. Further, the stroboscopic light 16 is emitted through the flash circuit 15 in order to correct the exposure with respect to a backlighted primary subject, or in order to correct a dark capturing area.

In step S219, since the exposure of the film 10 is completed, the film 10 is wound by one frame. The sequence is terminated.

Figure 6:
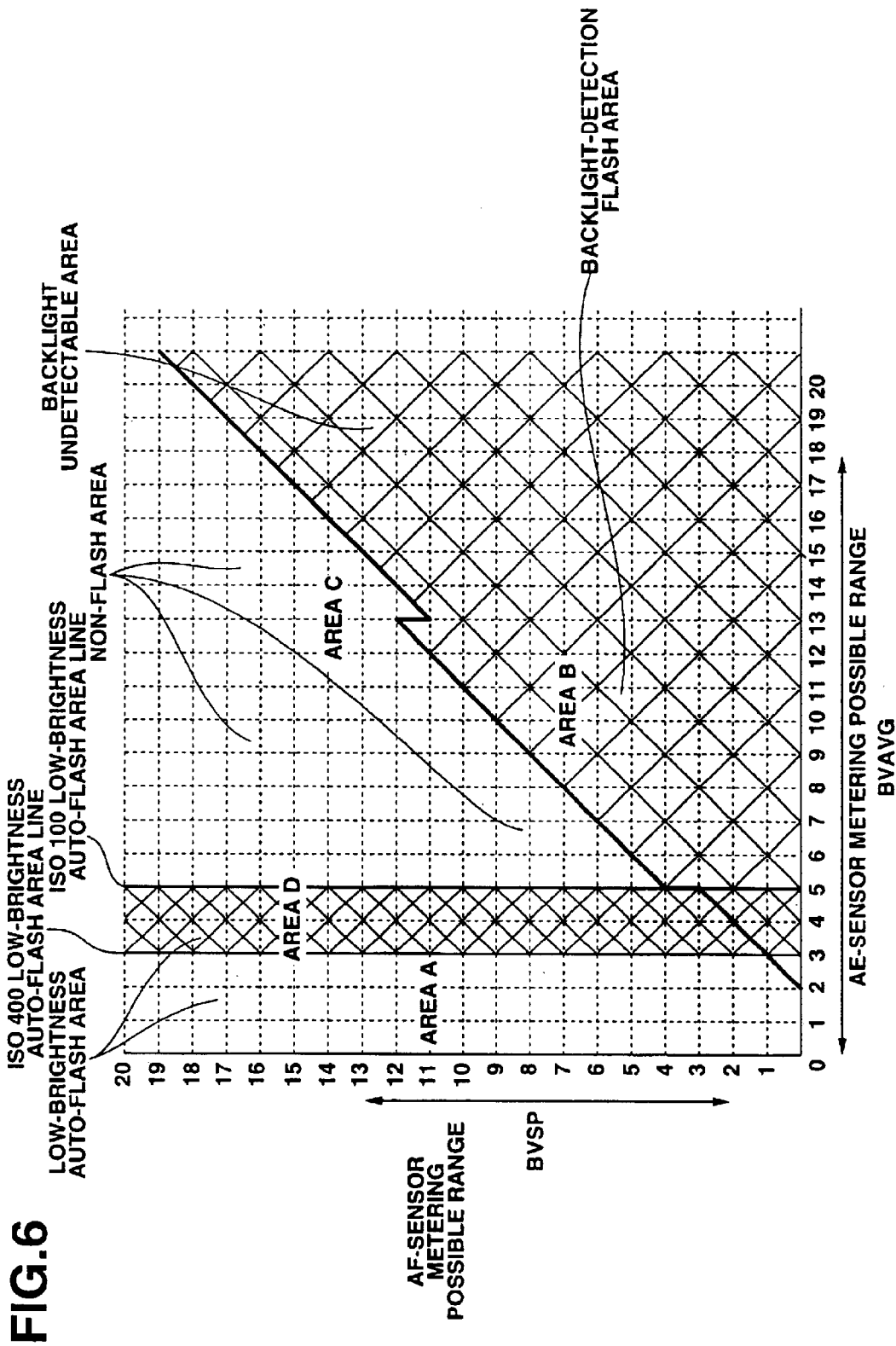
FIG. 6 is a graph explaining the relationship between the brightness BVSP measured by the distance-measuring sensors, the brightness BVAVG measured by the photometric sensors, and the stroboscopic light emission in executing a photographing sequence of FIG. 7, which will be described later.

FIG. 6 shows the relationship between the brightness BVSP of the distance-measuring sensors 3a and 3b, the brightness BVAVG of the photometric sensors 6a and 6b, and the stroboscopic light emission in the photographing sequence according to the modification of FIG. 7. In FIG. 6, the abscissa axis denotes the brightness BVAVG measured by the photometric sensors 6a and 6b. The ordinate axis denotes the brightness BVSP measured by the distance-measuring sensors 3a and 3b.

In FIG. 6, areas A and D each denote a low-brightness auto-flash area where the stroboscopic light is emitted on the basis of the above-mentioned low-brightness determination.

According to the present modification, each low-brightness auto-flash area is calculated on the basis of ISO sensitivity, shutter speed according to the focal length due to hand movement, an aperture value according to the focal length.

For example, according to the present modification, in the case of ISO 100 and the wide-angle mode, the low-brightness auto-flash area corresponds to the area D+A below BV5. In the case of ISO 400 and the wide-angle mode, the low-brightness auto-flash area corresponds to the area A below BV3.

An area B denotes a backlight auto-flash area in which the stroboscopic light is emitted on the basis of the foregoing backlight determination.

An area C denotes a non-flash area where the stroboscopic light is not emitted on the basis of the above-mentioned low-brightness determination and backlight determination.

In other words, according to the above modification, the threshold value to be used in the backlight determination using the photometric sensors 6a and 6b and the distance-measuring sensors 3a and 3b is changed in accordance with the photometrical value measured by the photometric sensors 6a and 6b. Consequently, even in a brightness area where the error caused by the distance-measuring sensors 3a and 3b is large, backlight can be correctly detected.

According to the present embodiment including the modification, each of the distance-measuring sensors is divided into 13 segments corresponding to distance-measuring points. When outputs of distance-measuring sensors divided according to other various modifications are used in primary subject photometry, the present invention can also be applied.

According to the present embodiment, the distance-measuring sensors having one-dimensional distance-measuring points are used. For instance, when outputs of the multi-distance-measuring sensors capable of distance-measuring two-dimensional areas are used in primary, subject photometry, the present invention can also be applied.

The present embodiment describes the camera using a silver halide film as an example. The present invention can also be applied to a digital camera in which a photographing optical system is different from a distance-measuring optical system.

According to the present embodiment, the photometrical value of the primary subject is used in backlight detection. The present invention can also be applied to a case where only exposure correction is performed on the basis of, for example, the photometrical value of an area other than the primary subject or the photometrical value of the whole capturing area measured by the distance-measuring sensors in a structure similar to the above.

The present embodiment describes the structure in which exposure is determined using the photometrical value of the primary subject measured by using a part of at least one distance-measuring sensor and the average photometrical value of the whole capturing area measured by the photometric sensors. The invention is not limited to the above case. For example, exposure can be determined using the photometrical value of the primary subject measured by using a part of at least one distance-measuring sensor and the photometrical value of the whole capturing area measured by using the whole of the distance-measuring sensors.

According to the present embodiment, photometry and backlight detection are included in automatic modes executed by the camera. For example, the invention can also be applied to a structure in which distance-measuring sensors are used in spot photometry and the like.

As mentioned above, therefore, according to the first embodiment, in the system for detecting backlight using the AF sensors and the AE sensors, when the photometrical value obtained by the AE sensors is equal to or larger than predetermined brightness, backlight detection is not performed. In the system for detecting backlight using multi-point AF sensors and pattern AE sensors, when the photometrical value obtained by at least one AE sensor is equal to or larger than predetermined brightness, backlight detection is not performed. Consequently, the camera, which can determine backlight without any inconvenience on photographing condition close to the very limit of the photometrical range, can be provided.

A wide-angle field distance-measuring camera according to a second embodiment will now be described hereinbelow.

Figure 8:
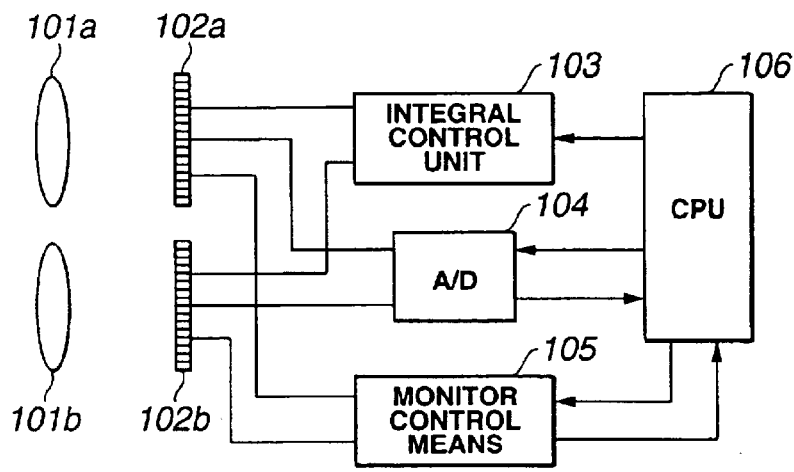
FIG. 8 is a block diagram showing the structure of a distance-measuring device built in a wide-angle field distance-measuring camera according to a second embodiment of the present invention.
Figure 9:
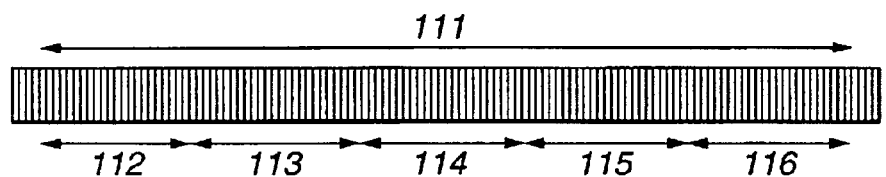
FIG. 9 is a diagram showing an example of setting of a monitor area for first integral and a calculation area in the distance-measuring device of FIG. 8.
Figure 10:
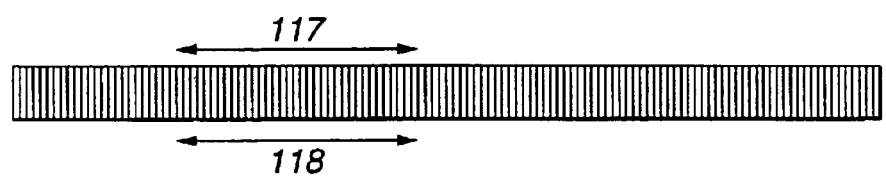
FIG. 10 is a diagram showing an example of setting of a monitor area for second integral and a calculation area in the distance-measuring device of FIG. 8.
Figure 11:
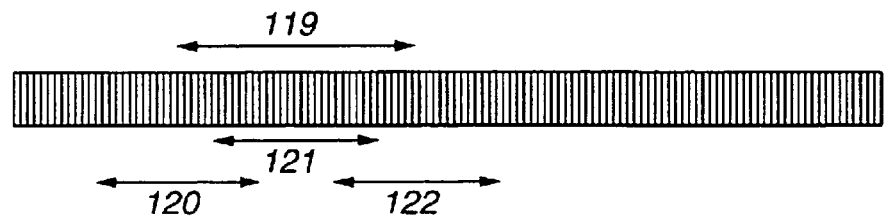
FIG. 11 is a diagram showing an example of setting of the monitor area for second integral and increased calculation areas in the distance-measuring device of FIG. 8.
Figure 12:
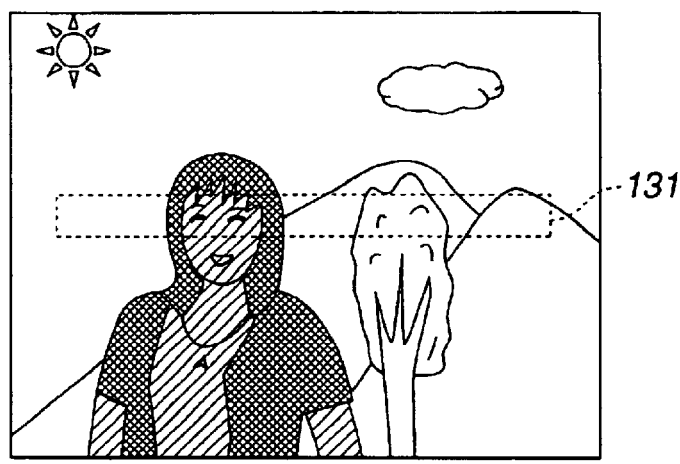
FIG. 12 is a view showing a photographing scene of the wide-angle field distance-measuring camera according to the second embodiment of the present invention.
Figure 13:
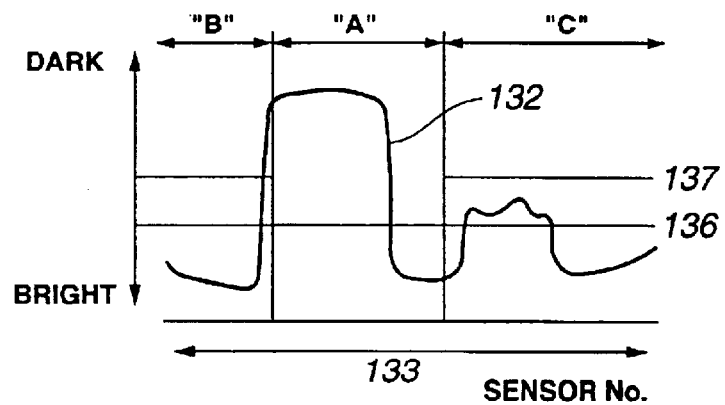
FIG. 13 is a graph showing subject image data obtained by integrating the photographing scene of FIG. 12 according to the first integral.
Figure 14:
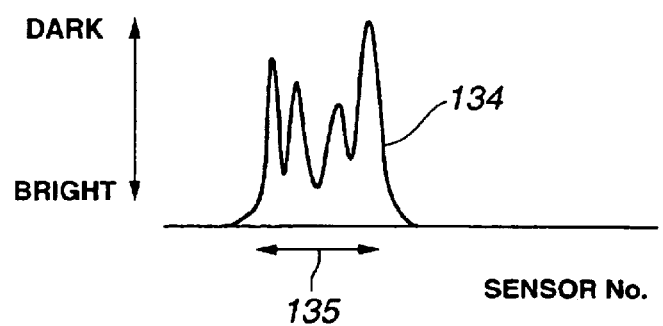
FIG. 14 is a graph showing subject image data obtained by integrating the photographing scene of FIG. 12 according to the second integral.
Figure 15:
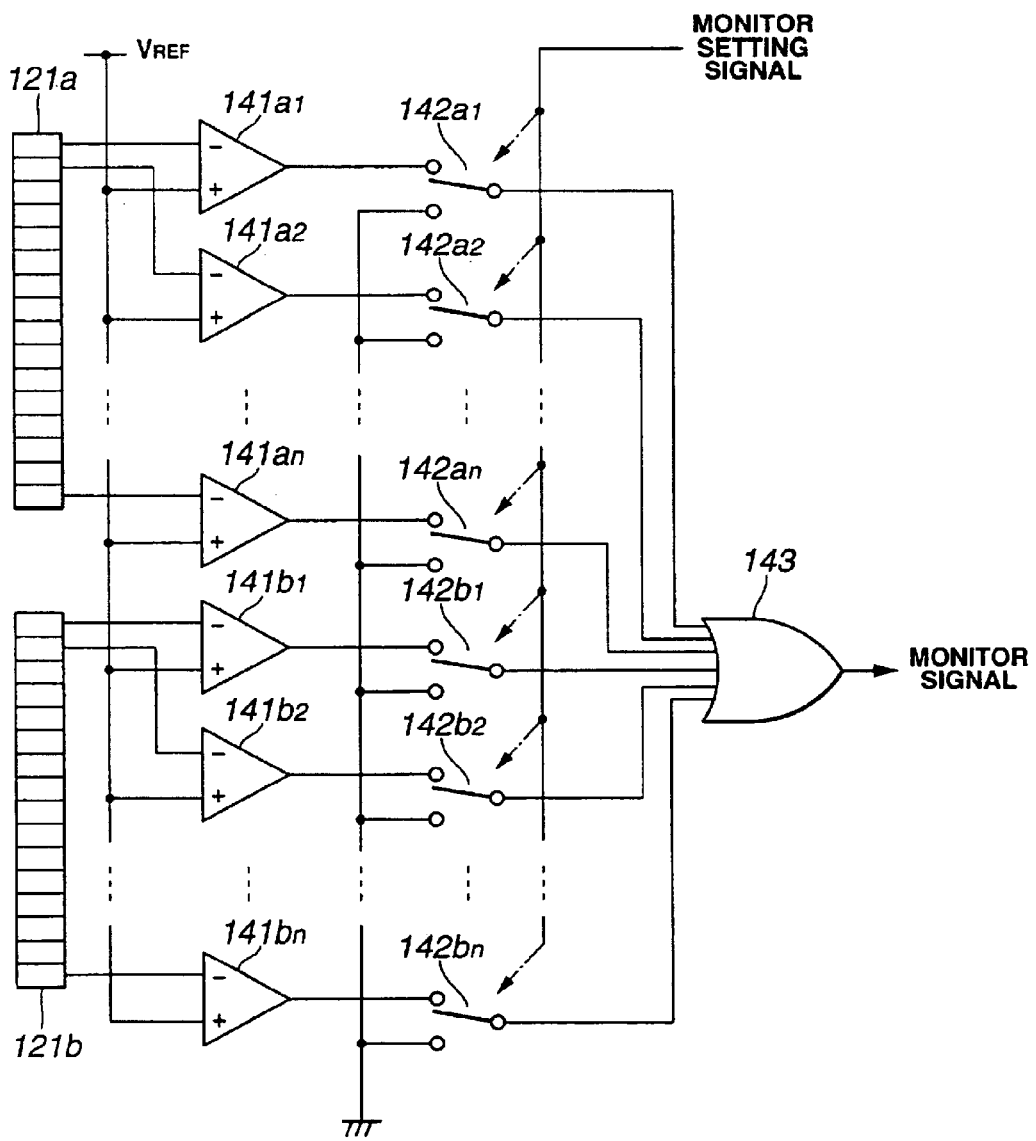
FIG. 15 is an electric circuit diagram showing a monitor circuit of the distance-measuring device in the wide-angle field distance-measuring camera according to the second embodiment of the present invention.

FIG. 8 is a diagram of the structure of a distance-measuring device in the wide-angle field distance-measuring camera according to the present embodiment. FIGS. 9, 10, and 11 are diagrams showing setting examples of monitor areas and calculation areas in the distance-measuring device in FIG. 8. FIG. 12 shows a photographing scene of the wide-angle field distance-measuring camera according to the second embodiment. FIGS. 13 and 14 show subject data thereof. FIG. 15 is a diagram of a monitor circuit of the distance-measuring device in FIG. 8.

Referring to FIG. 8, the distance-measuring device of the wide-angle field distance-measuring camera according to the present invention comprises: a pair of reception lenses 101a and 101b for forming subject images on a pair of line sensors 102a and 102b; the line sensors 102a and 102b for photoelectrically converting the subject images formed through the reception lenses 101a and 101b into electric signals in accordance with the intensity of light and generating the electric signals; integral control means 103 comprising an integral control circuit for controlling integral action by the line sensors 102a and 102b; an A/D conversion circuit 104 for analog-to-digital converting the analog electric signals generated from the line sensors 102a and 102b into digital signals; monitor control means 105 which includes monitor means for monitoring subject-brightness information during the integral action, sets a monitor area, and generates a monitor signal; and a CPU 106 for generating various control signals and performing various calculations such as calculation regarding a camera-to-subject distance and the like. The CPU 106 constitutes calculation means and low-brightness-area determination means according to the present invention.

As shown in FIG. 15, the monitor control means 105 comprises: comparators 141a1 to 141an and 141b1 to 141bn; input changeover switches 142a1 to 142an and 142b1 to 142bn; and an OR circuit 143 for outputting a monitor signal. Output terminals of the line sensors 102a are connected to respective input terminals of the comparators 141a1 to 141an. A reference voltage VREF is applied to the other input terminal of each of the comparators 141a1 to 141an. Output terminals of the line sensor 102b are connected to respective input terminals of the comparators 141b1 to 141bn. The reference voltage VREF is applied to the other input terminal of each of the comparators 141b1 to 141bn. Further, output terminals of the comparators 141a1 to 141an are connected to input terminals of the OR circuit 143 through the input changeover switches 142a1 to 142an, each of which can switch between the corresponding output terminal and a GND terminal. Output terminals of the comparators 141b1 to 141bn are connected to other input terminals of the OR circuit 143 through the input changeover switches 142b1 to 142bn, each of which can switch between the corresponding output terminal and a GND terminal.

The comparators 141a1 to 141an and 141b1 to 141bn each output a signal at an H (high) level when an integral voltage input from the corresponding line sensor 102a or 102b is equal to or lower than the reference voltage $V_{REF}$. The input changeover switches 142a1 to 142an and 142b1 to 142bn each switch between the output terminal of the corresponding comparator 141 and the GND terminal. Switching is performed due to a monitor setting signal in monitor setting, so that the input changeover switches 142a1 to 142an and 142b1 to 142bn are connected to the respective output terminals of the comparators 141a1 to 141an and 141b1 to 141bn. The OR circuit 143 outputs a monitor signal. When an integral voltage of any one of sensors set to monitor is equal to or less than VREF, the OR circuit 143 outputs a signal at an H (high) level.

A distance-measuring method of the wide-angle field distance-measuring camera according to the second embodiment of the present invention will now be described in brief with reference to the structure shown in FIGS. 8 and 15.

Subject images formed by the reception lenses 101a and 101b are subjected to the integral action on the line sensors 102a and 102b by the integral control means 103 while a monitor area 111 is set to a wide range of each line sensor as shown in FIG. 9 (the integral action will be referred to as first integral hereinbelow). An operation (hereinbelow, referred to as first calculation) to obtain camera-to-subject distance data is executed every calculation area set shown by reference numerals 112 to 116 in FIG. 9 on the basis of sensor data obtained by the first integral. Generally, data to be used in photographing is selected from the camera-to-subject distance data obtained in the respective calculation areas 112 to 116 by a predetermined selection method such as well-known closest selection.

Specifically, in distance-measuring in a backlight scene as shown in FIG. 12, a monitor area 133 is set and the first integral is performed. When the image of a person as a primary subject has relatively lower brightness and lower contrast against a background as shown by sensor data 132 in FIG. 13 (sensor data 132 is larger than a threshold line 136), a monitor area 135 is set in the area, where the low brightness and the low contrast are determined in the first integral, and integral action is then performed to this area as shown in FIG. 14 (the integral action will be referred to as second integral hereinbelow). As shown in FIG. 10, on the basis of sensor data 134 obtained by the second integral, a monitor area 117 is set and a calculation area 118 is set to the same range as the set monitor area 117 to obtain camera-to-subject distance data (hereinbelow, referred to as second calculation). On the basis of the data obtained by the first calculation and the data obtained by the second calculation, data to be used in photographing is selected by the selection method such as the foregoing well-known closest selection. For the area used in the second calculation, as shown in FIG. 11, monitor areas 120 to 122 can be set so as to include a monitor area 119 for the second integral.

Figure 24:
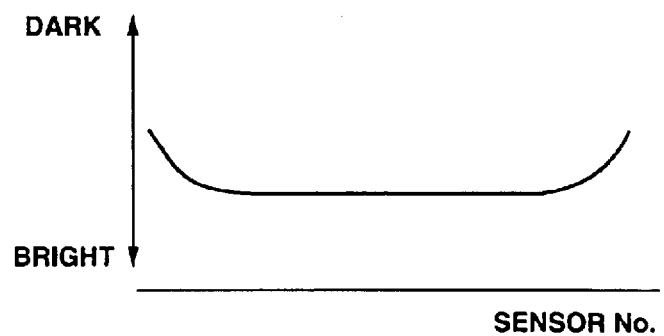
FIG. 24 is a graph showing sensor output data obtained by capturing a uniform brightness area through a sensor of a conventional camera.

In a camera having a taking lens (wide-angle lens) whose focal length is short, however, each of the line sensors is used from end to end in some cases because the angle of view of the taking lens is large and the angle of view of AF is also set to be large in accordance with the above angle of view. In this case, when a uniform brightness area is monitored, data obtained as being determined "dark" through the peripheral segments of the sensors is generated as shown in FIG. 24 due to a deterioration in the performance of the reception lenses for the AF sensors or a degradation in the sensitivity of the sensors. Accordingly, if it is determined using only the threshold line 136 in FIG. 13 that data obtained by the peripheral segments of the sensors indicates lower brightness and lower contrast than those obtained by the central segments thereof (the data obtained by the peripheral segments is higher than the threshold line 136), incorrect determination may be made.

In order to prevent the incorrect determination, a threshold line 137 for data of the peripheral segments is set in the vicinity of the threshold line 136, thus preventing incorrect determination of low brightness and low contrast due to the influence of the deterioration in the performance of the reception lenses or the degradation in the sensitivity of the sensors. In this instance, the threshold line 137 is used to determine that areas "B" and "C" shown in FIG. 13 indicate low brightness and low contrast.

In a case where the area of low brightness and low contrast based on sensor data obtained by the first integral is narrower than a predetermined range, when a subject in the area includes a person, the person exists far away. Accordingly, camera-to-subject distance data can be obtained by only the first calculation. When the subject is not a person, the subject actually has low brightness and low contrast. When the second integral is performed, the effect thereof is not derived. In this case, therefore, the second integral is not performed.

Figure 16:
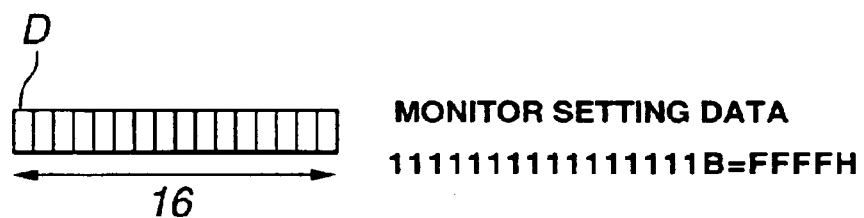
FIG. 16 is a diagram showing an example of a method for setting a monitor area in the wide-angle field distance-measuring camera according to the second embodiment of the present invention.
Figure 17:
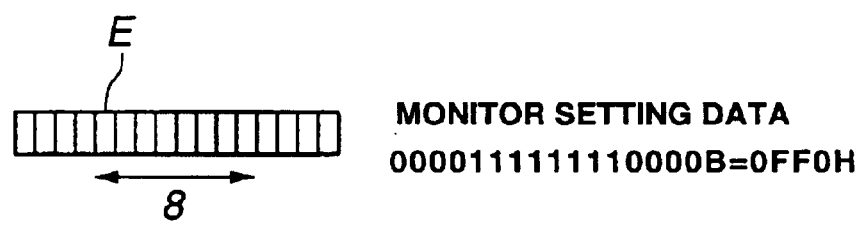
FIG. 17 is a diagram showing another example of the method for setting a monitor area in the wide-angle field distance-measuring camera according to the second embodiment of the present invention.
Figure 18:
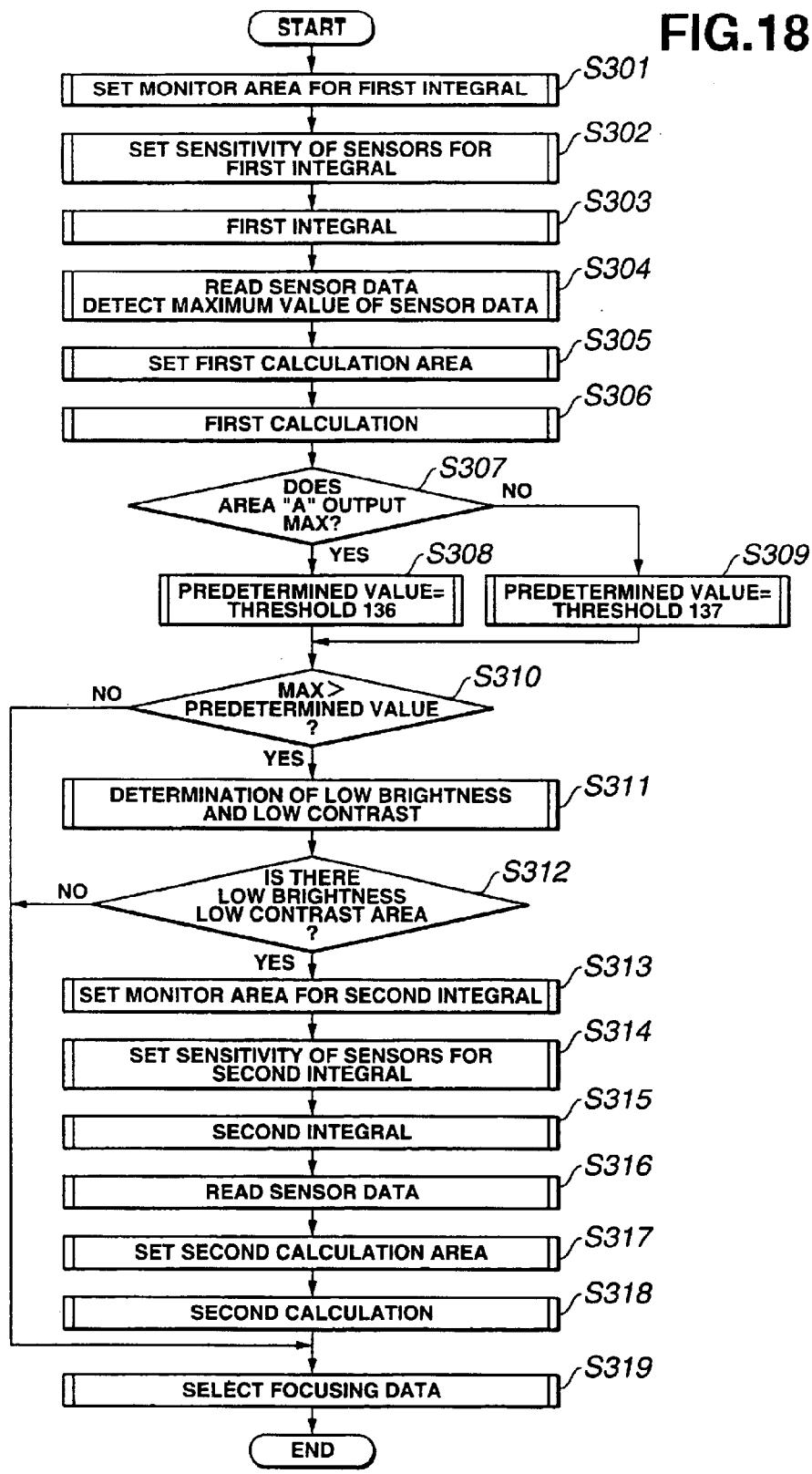
FIG. 18 is a flowchart of a distance-measuring sequence of the distance-measuring device in the wide-angle field distance-measuring camera according to the second embodiment of the present invention.

The distance-measuring operation of the wide-angle field distance-measuring camera according to the second embodiment of the present invention will now be described in detail. FIGS. 16 and 17 show examples of a method of setting a monitor area. FIG. 18 is a flowchart of the procedure of a distance-measuring sequence.

As shown in FIG. 18, in step S301, a monitor area for the first integral is set. Specifically, as shown in FIG. 16, when the number of sensor segments of each line sensor is, for example, "16" and all of the sensor segments are set so as to monitor, a sensor segment "D" in FIG. 16 is set to a reference and "1" is set to each bit of monitor setting data (monitor setting data=FFFFH). If eight central sensor segments are set so as to monitor, as shown in FIG. 17, a sensor segment "E" in FIG. 17 is set to a reference and "1" is set to each of eight bits of monitor setting data (monitor setting data=0FF0H). When the data is transferred to the monitor control means 105 by the CPU 106 shown in FIG. 8 in a serial communication manner, the monitor control means 105 controls the foregoing input changeover switches 142a1 to 142an and 142b1 to 142bn shown in FIG. 15 on the basis of the above-mentioned data to set a monitor area.

In step S302, on the basis of photometrical data and a pre-integral result, the sensitivity of the sensors for the first integral is set. The sequence proceeds to step S303. The sensitivity of the sensors can be switched between two levels of low sensitivity and high sensitivity or can also be switched between multiple levels larger than two levels.

In step S303, the first integral is performed using the monitor area and the sensitivity of the sensors set in steps S301 and S302. Then, the sequence proceeds to step S304. The first integral can be controlled in the following manner. A monitor signal at an H (high) level output from the monitor circuit as shown in FIG. 15 is detected to terminate the integral. Alternatively, an output integral voltage is evaluated in the CPU 106 using such monitor means that outputs an integral voltage of a sensor segment whose integral speed is the highest among those of the sensor segments in the monitor area as a monitor signal. On the basis of a result of the evaluation, the integral is terminated.

In step S304, subject signals obtained by the first integral in step S303 are A/D converted into digital signals by the A/D conversion circuit 104 shown in FIG. 8. The digital signals are read as sensor data into a RAM (not shown) in the CPU 106. In this instance, the maximum value MAX (sensor data obtained by integrating the darkest portion) of sensor data is also detected. After that, the sequence proceeds to step S305.

In step S305, the predetermined calculation areas 112 to 116 are set as shown in FIG. 9 mentioned above. The sequence proceeds to step S306. The set areas are not limited to those. The number of areas and the range can be changed depending on the specification of a camera, photographing conditions, and a mode.

In step S306, camera-to-subject distance data is obtained for every calculation area set in step S305 by predetermined correlation calculation and interpolation calculation and the like. The sequence proceeds to step S307. In step S307, whether the sensor segment, which outputs the value MAX of sensor data read in the RAM in step S304, corresponds to the area "A" in FIG. 13 mentioned above is determined. If the sensor segment corresponds to the area "A", the sequence proceeds to step S308. The above-mentioned threshold line 136 is selected shown in FIG. 13. Then, the sequence proceeds to step S310. On the other hand, if the sensor segment corresponds to the area "B" or "C" other than the area "A" in the foregoing determination in step S307, the sequence branches to step S309. The foregoing threshold line 137 in FIG. 13 is selected. Then, the sequence proceeds to step S310.

In step S310, whether the maximum value MAX of the sensor data detected in step S304 is larger than a predetermined value (namely, whether the value MAX is higher than the threshold line 136 or 137) is determined. If the value MAX is larger than the predetermined value, the sequence proceeds to step S311. If the value MAX is smaller than the predetermined value, it is determined that the sensor data does not indicate low brightness. The sequence skips to step S319.

In step S311, whether the sensor data obtained by the first integral in step S303 includes an area indicating low brightness and low contrast is determined. Then, the sequence proceeds to step S312. In step S312, whether there is an area indicating low brightness and low contrast is determined on the basis of the determination in step S311. If YES, the sequence proceeds to step S313. If NO, the sequence skips to step S319.

In step S313, on the basis of a result of the determination in step S311, a monitor area for the second integral is set. As shown in FIG. 13, if the sensor data 132 indicating that the image of a person as a primary subject has low brightness and low contrast is obtained in the first integral in which the monitor area is set to the range 133, the monitor area for the second integral is set to the range corresponding to the monitor area 135 shown in FIG. 14. For setting of the monitor area, in a manner similar to the setting method described in step S301, "1" is set to each bit of monitor setting data corresponding to the monitor area 135, the set data is transferred to the monitor control means 105 by the CPU 106 shown in FIG. 8, the monitor control means 105 controls the input changeover switches 142a1 to 142an and 142b1 to 142bn shown in FIG. 15 to set the monitor area. Then, the sequence proceeds to step S314.

In step S314, on the basis of the maximum value MAX of the foregoing sensor data detected in step S304 and an average value of the low-brightness low-contrast portion detected in step S311, the sensitivity of the sensors for the second integral is set. The sequence proceeds to step S315. In step S315, the second integral is performed using the monitor area and the sensitivity of the sensors set in steps S313 and S314. The sequence proceeds to step S316. The second integral is controlled in a manner similar to step S303.

In step S316, subject image signals obtained by the second integral are A/D converted into digital signals through the A/D conversion circuit 104 in FIG. 8. The digital signals are read as sensor data into the RAM of the CPU 106. The sequence proceeds to step S317. For the sensor data to be read, data of all the sensor segments can be read. Alternatively, only sensor data in a second calculation area set in step S317, which will be described hereinbelow, can be read.

In step S317, a calculation area for the second calculation is set. The sequence proceeds to step S318. For an area to be set, as shown in FIG. 10, an area can be set such that the monitor area 118 corresponds to the same range as that of the monitor area 117. Alternatively, as shown in FIG. 11, a plurality of areas can be set such that the monitor areas 120 to 122 correspond to the monitor area 119.

In step S318, camera-to-subject distance data is obtained for every calculation area set in step S317 by predetermined correlation calculation and interpolation calculation and the like. The sequence proceeds to step S319. In step S319, camera-to-subject distance data to be used in photographing is selected from the camera-to-subject distance data obtained in steps S306 and S318 by the closest selection or the like. The sequence is then returned.

The procedure of the sequence of determining low brightness and low contrast in step S311 will now be described in detail with reference to a flowchart of FIG. 19.

Figure 19:
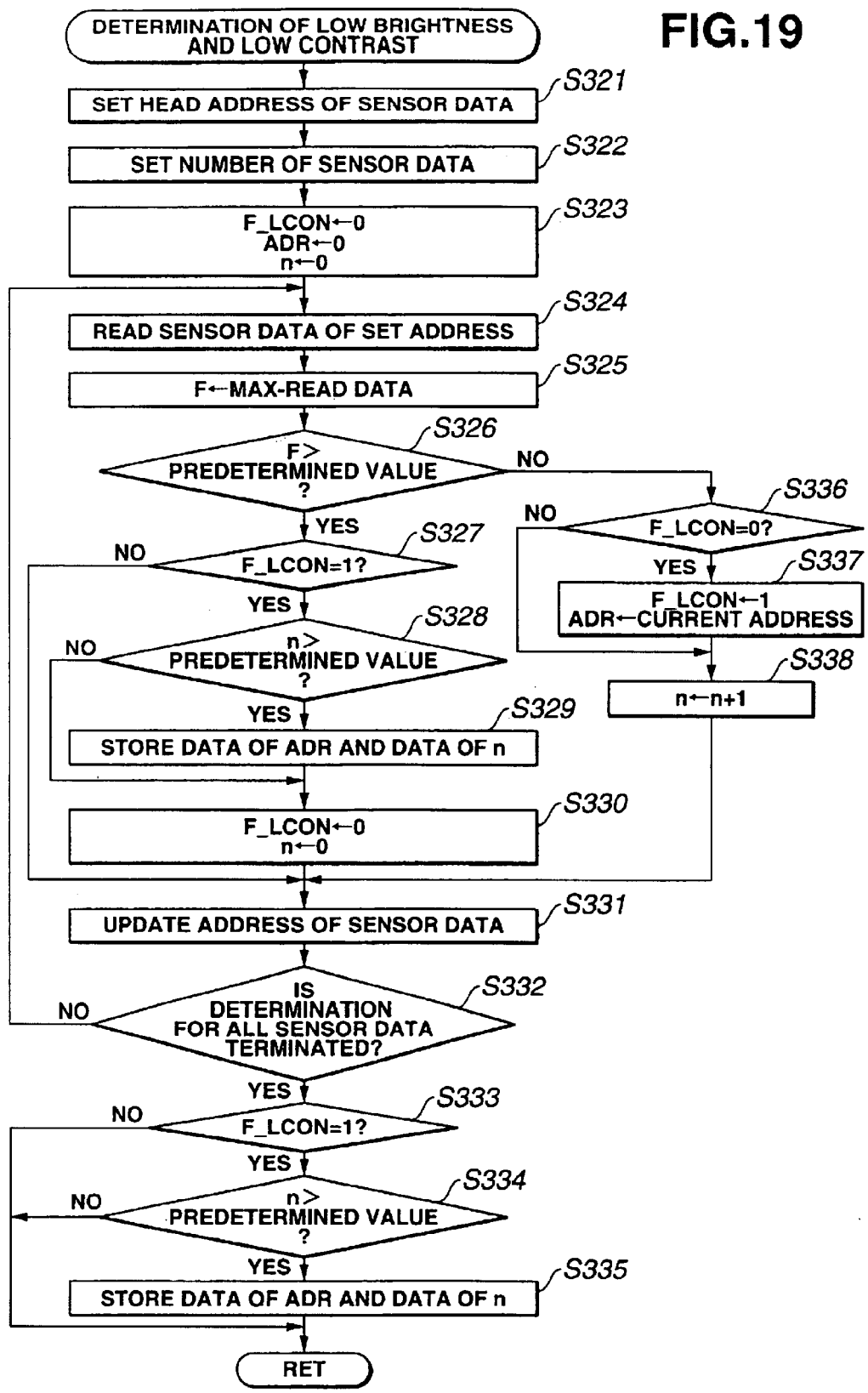
FIG. 19 is a flowchart of a "low-brightness and low-contrast" determination sequence in the distance-measuring sequence of FIG. 18.

Referring to FIG. 19, in step S321, the head address of sensor data stored in the RAM of the CPU 106 in FIG. 8 is set. The sequence proceeds to step S322. In step S322, the number of sensor data stored in the RAM of the CPU 106 is set. The sequence proceeds to step S323. In step S323, F_LCON (low-contrast flag), ADR (head address data indicating low-brightness low-contrast area), and number n (the number of sensor segments corresponding to the low-brightness low-contrast area) are cleared. The sequence proceeds to step S324.

In step S324, the sensor data with the address currently set in the RAM is read. The sequence proceeds to step S325. In step S325, the difference between the maximum value MAX of sensor data detected in step S304 in FIG. 18 and the sensor data read in step S324 is stored in the RAM (the difference will be referred to as "F" hereinbelow). The sequence proceeds to step S326.

In step S326, low-contrast determination is performed. If the value "F" obtained in step S325 is larger than a predetermined value, it is determined that contrast is not low. The sequence proceeds to step S327. On the other hand, if "F" is smaller than the predetermined value, the sequence branches to step S336.

In step S327, whether previous sensor data indicates low contrast is determined. If F_LCON (low-contrast flag)=1, it is determined that the data indicates low contrast. The sequence proceeds to step S328. If F_LCON=0, it is determined that the data does not indicate low contrast. The sequence skips to step S331.

In step S328, whether the low-contrast area is larger than a predetermined range is determined. If the number of sensor segments n corresponding to the low-brightness low-contrast area is larger than a predetermined value, it is determined that the area is larger than the predetermined area. The sequence proceeds to step S329. If the number n is smaller than the predetermined value, it is determined that the area is smaller than the predetermined range. The sequence skips to step S330.

In step S329, data indicating the head address ADR of the low-brightness low-contrast area and data indicating the number of sensor segments n corresponding to the low-brightness low-contrast area are stored as data indicating the low-brightness low-contrast area. The sequence proceeds to step S330. In step S330, the F_LCON and the number of sensor segments n corresponding to the low-brightness low-contrast area are cleared. The sequence proceeds to step S331.

In this instance, if "F" obtained in step S325 is smaller than the predetermined value in step S326, whether the previous sensor data indicates low contrast is determined in step S336. If the F_LCON=0, it is determined that the data does not indicate low contrast. The sequence proceeds to step S337. If the F_LCON=1, it is determined that the data indicates low contrast. The sequence skips to step S338.

In step S337, the F_LCON is set. The RAM address of the current sensor data is stored in ADR serving as a head address of the low-brightness low-contrast area. The sequence proceeds to step S338. In step S338, 1 is added to the number of sensor segments n corresponding to the low-brightness low-contrast area. The sequence proceeds to step S331.

In step S331, a RAM address of sensor data to be read next is set. The sequence proceeds to step S332. In step S332, whether the low-contrast determination for all of sensor data is completed is determined. If YES, the sequence proceeds to step S333. If NO, the sequence is returned to step S324 to repeat steps S324 to S332.

In step S333, whether the last sensor data indicates low contrast is determined. If F_LCON=1, it is determined that the data indicates low contrast. The sequence proceeds to step S334. If F_LCON=0, it is determined that the data does not indicate low contrast. The sequence is returned.

In step S334, whether the last low-contrast area is larger than the predetermined range is determined. If the number n is larger than the predetermined value, it is determined that the area is larger than the predetermined range. The sequence proceeds to step S335. If the number n is smaller than the predetermined value, it is determined that the area is smaller than the predetermined range. The sequence is returned.

In step S335, in a manner similar to step S329, data of the head address ADR of the low-brightness low-contrast area and data indicating the number of sensor segments n corresponding to the low-brightness low-contrast area are stored as data indicating the low-brightness low-contrast area. Then, the sequence is returned.

As mentioned above, in the wide-angle field distance-measuring camera according to the second embodiment of the present invention, even in the case where a primary subject has lower brightness than that of a background like a backlight scene, when a low-brightness low-contrast area included in sensor data of the line sensors 102a and 102b is determined, determination is made using the two threshold lines 136 and 137. The threshold line 136 is used for the central portion of each line sensor. The threshold line 137 is used for the peripheral portions of the line sensors. The threshold line 136 is lower than the threshold line 137. Consequently, when the line sensors are used from end to end in determination, the determination is not influenced by the influence of the deterioration in the performance of the reception lenses or the degradation in the sensitivity of the sensors, thus preventing incorrect determination. Accordingly, enough contrast can be derived. The distance to a primary subject can be measured with high accuracy. As mentioned above, an area indicating relatively low brightness and relatively low contrast is detected in sensor data and a monitor area is set. Even when a primary subject exists in an area other than the center of a capturing area, correct distance-measuring can be performed.

A wide-angle field distance-measuring camera according to a third embodiment of the present invention will now be described with reference to FIGS. 20 and 22, etc.

Figure 20:
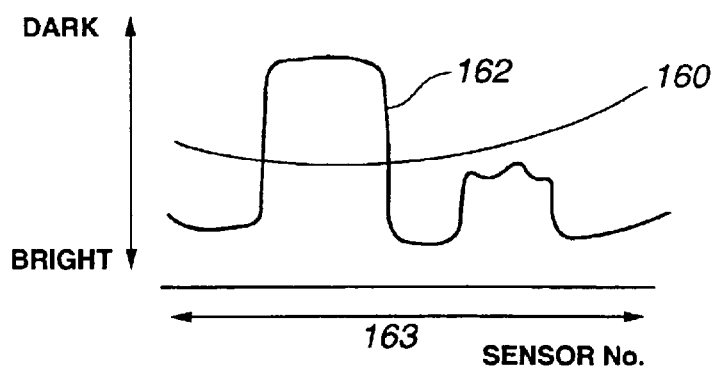
FIG. 20 is a graph showing output data of line sensors of a distance-measuring device in a wide-angle field distance-measuring camera according to a third embodiment of the present invention.

FIG. 20 is a graph of output data of line sensors in the wide-angle field distance-measuring camera according to the third embodiment. FIG. 22 is a flowchart of the procedure of a distance-measuring sequence of a distance-measuring device in the wide-angle field distance-measuring camera according to the third embodiment, the distance-measuring sequence using a threshold line as a high-order curve.

For the wide-angle field distance-measuring camera according to the third embodiment, the structure of the distance-measuring device thereof and a method for setting a monitor area are substantially the same as those shown in FIGS. 8 to 19 according to the second embodiment. The third embodiment differs from the second embodiment with respect to a point that a high-order curve is used instead of the threshold lines 136 and 137 shown in FIG. 13 used in the determination of whether a subject has lower brightness than that of a background. Accordingly, only the difference therebetween will now be described. The explanation regarding the content similar to that of the second embodiment is omitted.

In the case of the photographing scene as shown in FIG. 12, a monitor area is set and the first integral is performed to obtain sensor data as shown in FIG. 20. Then, whether the image of a person as a primary subject has low brightness is determined using a threshold line 160 as a high-order curve.

A distance-measuring sequence using the threshold line as a high-order curve will now be described with reference to FIG. 22.

For the procedure of the distance-measuring sequence shown in FIG. 22, a flow of steps S401 to S406 is similar to the flow of steps S301 to S306 shown in FIG. 18 according to the second embodiment. Further, steps S408 to S416 are also similar to steps S311 to S319 in FIG. 18.

Therefore, the difference between the sequences is only determination in step S407. If it is determined in step S407 that the maximum value MAX of the sensor data detected in step S404 is higher than the high-order curve 160 ($ax^n+bx^{n-1}+\ldots+cx+d$), the sequence proceeds to step S408. If the value MAX is lower than the curve, it is determined that the sensor data does not include an area indicating low brightness. The sequence skips to step S416. Reference symbol x in the expression of the curve 160 denotes the sensor segment number. In FIG. 20, reference numeral 163 denotes a monitor area and reference numeral 162 denotes sensor output data.

As mentioned above, advantages similar to those of the second embodiment of the present invention can be obtained using the threshold line 160 serving as the high-order curve.

A wide-angle field distance-measuring camera according to a fourth embodiment of the present invention will now be described with reference to FIGS. 21 and 23.

Figure 21:
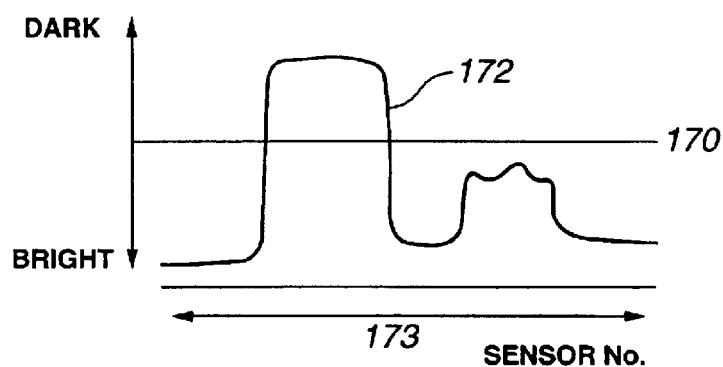
FIG. 21 is a graph showing output data of line sensors of a distance-measuring device in a wide-angle field distance-measuring camera according to a fourth embodiment of the present invention.

FIG. 21 is a graph showing output data of line sensors in the wide-angle field distance-measuring camera according to the fourth embodiment. FIG. 23 is a flowchart of a distance-measuring sequence of a distance-measuring device in the wide-angle field distance-measuring camera according to the fourth embodiment.

For the wide-angle field distance-measuring camera according to the fourth embodiment, the structure of the distance-measuring device thereof and a method for setting a monitor area are substantially the same as those shown in FIGS. 8 to 19 according to the second embodiment. The fourth embodiment differs from the second embodiment with respect to a point that before determination of whether a subject has lower brightness relatively than that of a background, sensor data is corrected by the amount as much as the influence of a deterioration in the performance of the reception lenses or a degradation in the sensitivity of the sensors, and the determination is then made using only one threshold line. Accordingly, only the difference therebetween will now be described.

In the case of the photographing scene as shown in FIG. 12, a monitor area is set, and the first integral is performed as shown in FIG. 21. Then, in determination of whether the image of a person as a primary subject has low brightness, the sensor data is corrected using sensor data, shown in FIG. 24, obtained when the sensors monitor an uniform brightness area. The determination is made using a threshold line 170 (predetermined value).

A distance-measuring sequence using the above sensor data will now be described with reference to FIG. 23. For the procedure of this distance-measuring sequence, a flow of steps S421 to S424 is similar to the flow of steps S301 to S304 shown in FIG. 18 according to the second embodiment. Further, steps S426 and S427 are also similar to steps S305 and S306 in FIG. 18. Steps S428 to S437 are also similar to steps S310 to S319 in FIG. 18. Therefore, the difference between the sequences is only the operation for correcting sensor data in step S425.

In step S425, as shown in FIG. 24 mentioned above, the sensor data obtained when the sensors monitor a uniform brightness area is used. Sensor data is corrected using the sensor data obtained as mentioned above. The sequence proceeds to step S426. In FIG. 21, reference numeral 173 denotes a monitor area and reference numeral 172 denotes sensor output data.

As mentioned above, according to the fourth embodiment, even in a case where a primary subject has lower brightness than that of a background like a backlight scene, in determination of a low-brightness low-contrast area included in sensor data, this sensor data is corrected using sensor data obtained when the sensors monitor a uniform brightness area. Consequently, the determination can be made using the threshold line 170 (predetermined value). When each line sensor is used from end to end in determination, the determination is not influenced by a deterioration in the performance of the reception lenses and a degradation in the sensitivity of the sensors, thus preventing incorrect determination. Consequently, enough contrast can be obtained and the distance to a primary subject can be measured with high accuracy. As mentioned above, an area with relatively low brightness and relatively low contrast is detected to set a monitor area. Consequently, when a primary subject exists in an area other than the center of a capturing area, the distance to the subject can be measured correctly.

As mentioned above, according to the second to fourth embodiments of the present invention, there can be provided a wide-angle field distance-measuring camera having a distance-measuring device, wherein even when each line sensor is used from end to end, the determination is not influenced by a deterioration in the performance of the reception lenses or a degradation in the sensitivity of the sensors so that incorrect determination that a subject has low brightness and low contrast can be prevented. Accordingly, the distance-measuring device can measure a distance to a primary subject with reliability independently of the condition of a background with higher brightness than that of the primary subject.

What is claimed is:

1. A camera comprising:

exposure means for use in photographing a subject;

a sensor array which can detect a brightness signal of the subject and which has a plurality of segments for focal point detection;

first photometry means for calculating a first brightness signal of the subject based on an output of one segment or outputs of the segments of the sensor array;

second photometry means for detecting and calculating a second brightness signal of the subject in a brightness range wider than a range for detection of the subject brightness signal by the sensor array;

first determination means for determining whether the second brightness signal is larger than a predetermined value; and second determination means for determining whether a difference between the second brightness signal and the first brightness signal is greater than a predetermined value; and exposure control means for controlling exposure based on the second brightness signal, if the first determination means determines that the second brightness signal is larger than the predetermined value, and for controlling the exposure based on an output of the second determination means, if the first determination means determines that the second brightness signal is not larger than the predetermined value.

* * * * *